(12) United States Patent
Marciano et al.

(10) Patent No.: US 12,447,402 B2
(45) Date of Patent: Oct. 21, 2025

(54) METHOD OF FACILITATING A SYNCHRONIZED PLAY OF CONTENT AND SYSTEM THEREOF

(71) Applicant: DAZN Media Israel Ltd., Hertsliya (IL)

(72) Inventors: Matan Marciano, Karmiel (IL); Boris Meshner, Raanana (IL); Or Aini, Haifa (IL); Liron Greenberg, Haifa (IL); Netanel Yuval Aharon, Aviezer (IL); Guy Zisman, Kibutz Sdot Yam (IL); Gad Geffen, Matan (IL); Amir Shimoni, Gan Yoshiya (IL); Amir Segev, Even Yehuda (IL)

(73) Assignee: DAZN Media Israel Ltd., Hertsliya (IL)

( * ) Notice: Subject to any disclaimer, the term of this patent is extended or adjusted under 35 U.S.C. 154(b) by 679 days.

(21) Appl. No.: 17/687,917

(22) Filed: Mar. 7, 2022

(65) Prior Publication Data
US 2023/0277927 A1  Sep. 7, 2023

(51) Int. Cl.
*A63F 13/355* (2014.01)

(52) U.S. Cl.
CPC .................... *A63F 13/355* (2014.09)

(58) Field of Classification Search
CPC ............ H04N 21/242; H04N 21/4302; H04N 21/43074; H04N 21/8133; A63F 13/355
See application file for complete search history.

(56) References Cited

U.S. PATENT DOCUMENTS

| | | | |
|---|---|---|---|
| 10,979,477 B1* | 4/2021 | Cabrido | H04L 65/611 |
| 2011/0122315 A1 | 5/2011 | Schweiger et al. | |
| 2011/0246908 A1 | 10/2011 | Akram et al. | |
| 2012/0114307 A1 | 5/2012 | Yang et al. | |
| 2012/0198317 A1 | 8/2012 | Eppolito et al. | |
| 2012/0311043 A1 | 12/2012 | Chen et al. | |
| 2013/0216206 A1 | 8/2013 | Dubin et al. | |
| 2014/0089990 A1 | 3/2014 | Van Deventer et al. | |

(Continued)

FOREIGN PATENT DOCUMENTS

| | | |
|---|---|---|
| EP | 3304541 A1 | 4/2018 |
| GB | 2575873 A | 1/2020 |

(Continued)

OTHER PUBLICATIONS

Brownlee, J. (2020) How to Calculate Correlation Between Variables in Python—MachineLearningMastery.com.

*Primary Examiner* — Xuan M Thai
*Assistant Examiner* — Ankit B Doshi
(74) *Attorney, Agent, or Firm* — The Roy Gross Law Firm, LLC; Roy D. Gross

(57) ABSTRACT

In a user's device, a computerized method for facilitating a synchronized play of content by a user device's player is provided. The method comprising: receiving a reference position in the content; retrieving a player position in the content; and based on the received reference position and the retrieved player position: determining if the player position is nearly synchronized with the reference position; and if in the negative, applying a synchronization process to reach a calculated sync player position, such that the player position, when reaching the sync player position, is nearly synchronized with the reference position.

27 Claims, 14 Drawing Sheets

(56) References Cited

U.S. PATENT DOCUMENTS

| | | | |
|---|---|---|---|
| 2014/0094302 A1* | 4/2014 | Wilkiewicz | A63F 13/92 463/31 |
| 2014/0282722 A1* | 9/2014 | Kummer | H04N 5/76 725/35 |
| 2015/0078729 A1* | 3/2015 | Sipe | H04N 21/440245 386/241 |
| 2015/0120336 A1 | 4/2015 | Grokop et al. | |
| 2015/0134724 A1* | 5/2015 | Hao | H04L 65/403 709/203 |
| 2016/0080830 A1* | 3/2016 | Kim | H04N 21/2665 725/19 |
| 2016/0174010 A1 | 6/2016 | Mohammad et al. | |
| 2016/0269771 A1 | 9/2016 | Bangma et al. | |
| 2017/0093943 A1 | 3/2017 | Alsina et al. | |
| 2017/0238058 A1 | 8/2017 | Wong et al. | |
| 2018/0130482 A1 | 5/2018 | Michel et al. | |
| 2018/0255332 A1 | 9/2018 | Heusser | |
| 2018/0295402 A1 | 10/2018 | Francisco | |
| 2018/0352286 A1 | 12/2018 | Rennison et al. | |
| 2019/0387313 A1 | 12/2019 | Bharitkar et al. | |
| 2020/0314479 A1 | 10/2020 | Umansky et al. | |
| 2021/0044867 A1* | 2/2021 | Butters | H04N 21/4302 |
| 2021/0235149 A1 | 7/2021 | Madison et al. | |
| 2021/0329317 A1 | 10/2021 | Dodson et al. | |
| 2021/0352359 A1 | 11/2021 | Barvo et al. | |

FOREIGN PATENT DOCUMENTS

| | | |
|---|---|---|
| KR | 20220017775 A | 2/2022 |
| WO | 2022030857 A | 2/2022 |

\* cited by examiner

1100 determining that the player position is not sync 530

↓ applying a synchronization process 540

↓ determining that the player cannot reach sync 1110

↓ transmitting a failure sync notification 1120

↓ receiving an updated reference position 1130

↓ applying the synchronization process 1140

*Fig 11*

METHOD OF FACILITATING A SYNCHRONIZED PLAY OF CONTENT AND SYSTEM THEREOF

TECHNICAL FIELD

The presently disclosed subject matter relates to synchronized play of content, and, more particularly, to synchronized play of content by a player of a user device player, or by a plurality of players of user devices.

BACKGROUND

When a content provider, also to be referred to herein as a service provider, provides content for playing on a user device, the content provider would like that this content be played in the best manner in terms of user experience. If the content is live content, the content provider would like that this content be played as close to the live broadcast time as possible. If several users wish to view together the same content, or share either a live content or a VOD content, it is desired that this content is played in a synchronized manner in all devices of the users. Synchronization is even more important and sometimes crucial if the users wish also to communicate and share experiences and thoughts on the content. It is therefore desired that the content is played in a synchronized manner, such that when they share their experiences and thoughts on the content, the content that is played to each of the users is played at the same time. Otherwise, some users may comment or act with respect to content that has not yet been played for other users. If the content is live content, then the synchronization challenge is added to the challenge of playing the content as close to the live broadcast as possible.

As users use various types of devices, each having its own capabilities, with different players installed on the devices which use different protocols for consuming the content, it is therefore desired to synchronize between the content that is played on all devices that wish to share a certain content.

GENERAL DESCRIPTION

The synchronized play of content faces many challenges, including challenges involved in synchronized play of live shared content, e.g., to keep the shared playing as close as possible to the time that the live content is broadcast, through managing the synchronized play, when considering various types of devices and players on the devices that each of the users that wish to view the content, operate. Other challenges which have to be addressed, involve the synchronized play of content when a group of different devices, operated by the same user or several users, wish to share the content and data pertaining to the content, in a synchronized manner.

While known systems enable to implement synchronization to some extent, these systems do not enable play of the content in multiple devices in a manner that enable the devices to view the content in a fully synchronized manner, without modification of the content itself, independent of the types of devices, players, and protocols used for viewing the content. In addition, known systems do not enable users to share experiences and communicate with respect to the shared content, such that they all relate to the same event in the content. Yet, additionally, known systems do not enable users to control shared content such that a synchronized view of the content is maintained.

To illustrate such challenges, assume there is a group of friends who wish to view a live football game. If the group members wish to share the same live football game, on different devices, while sharing experiences on the content, e.g., through a chat, then it is crucial that they all play the same football game in a fully synchronized, or nearly synchronized, manner. Assume also that the members of the group use various types of devices, each having its own capabilities to play the shared content (processing time, memory, buffering abilities, traffic bandwidth, quality of Internet, or other communication connection etc.), and considering various players installed on each user device and the protocols used by the devices to obtain the content. All these factors influence how and when content is played on each device. If, for example, one member of this group uses a device which is advanced, and is a newer-generation device than another device used by another member of the group, the first user having the newer-generation device can perform better and keep up with the progress of a content streaming, and the device may be able to play the content more closely to the live broadcast. The older-generation device will, however, lag behind the live broadcast. The live broadcast of the content to the two devices, using known systems, will result in low user experience of content sharing between these two devices, as the member of the group, having the more advanced device, may communicate with the others on content that has not yet been played on their device, while spoiling the events in the game to others.

It is therefore desired to be able to play the content in a synchronized manner to all users, irrespective of how many devices play the content, which type of device plays the content, whether the content is provided as live or as VOD content, and without modifying the content itself.

According to one aspect of the presently disclosed subject matter there is provided, in a user's device, a computerized method for facilitating a synchronized play of content by a user device's player, the method comprising:
 receiving a reference position in the content;
 retrieving a player position in the content; and
 based on the received reference position and the retrieved player position:
  determining if the player position is nearly synchronized with the reference position; and
  if in the negative, applying a synchronization process to reach a calculated sync player position, such that the player position, when reaching the sync player position, is nearly synchronized with the reference position.

In addition to the above features, the system according to this aspect of the presently disclosed subject matter can comprise one or more of features (i) to (xxiii) listed below, in any desired combination or permutation which is technically possible:

(i). wherein receiving the reference position further comprises calculating a normalized reference position based on the received reference position, and determining if the player position is nearly synchronized, based on the calculated normalized reference position;

(ii). wherein receiving the reference position comprises receiving a content playing state; and applying the synchronization process based at least on the received content playing state;

(iii). wherein determining if the player position is nearly synchronized further comprises: calculating a distance between the reference position and the player position;

and determining that the player position is nearly synchronized when the distance does not exceed a pre-configured threshold;

(iv). wherein applying the synchronization process further comprises: obtaining capabilities of the player; selecting, based on the obtained player capabilities, at least one sync algorithm; and calculating, based on the selected at least one sync algorithm, the sync player position; and reaching the calculated sync player position, by applying the selected at least one sync algorithm;

(v). wherein the player capabilities are selected from a group consisting of: play at speed, frame accurate seek, controlled buffer size and bandwidth meter, control of average bitrate (ABR) profiles and control of player buffering sizes or a combination thereof, and wherein the at least one sync algorithm is selected from a group comprising: play at speed, seek and pause, seek to position, or a combination thereof;

(vi). wherein the player capabilities comprise play at speed, and wherein the selected at least one sync algorithm comprises play at speed, the method further comprising: calculating a speed matrix comprising at least one degree of speed to apply to reach a position constituting the sync player position; and reaching the sync player position by applying the play at speed algorithm;

(vii). wherein calculating the speed matrix is based at least on one or more of: smooth video playing, time of running in speed mode, and player learned behavior;

(viii). the method further comprising: determining that the player position is not nearly synchronized with the reference position, such that the distance between the reference position and the player position does exceed the pre-configured threshold, constituting a first threshold, but the distance does not exceed a pre-configured second threshold, the second threshold is larger than the first threshold; and applying the synchronization process by selecting play at speed, to reach the sync player position.

(ix). wherein applying the play at speed algorithm comprises controlling at least one additional player function to facilitate an improved play of the content during the reaching process;

(x). wherein controlling the at least one additional player function comprises controlling a volume of the player;

(xi). wherein the player capabilities comprise frame accurate seek, and wherein the selected at least one sync algorithm comprises seek and pause, the method further comprising: calculating a sync player position that exceeds the reference position; seeking to the calculated sync player position, and pausing from playing the content;

(xii). wherein an attempt includes reaching of the player to a previously calculated sync player position using selected at least one sync algorithm, and a result of each attempt includes either success or failure to reach the sync player position, and wherein selecting the at least one sync algorithm further comprises: obtaining a history of attempts and respective attempts results; selecting the at least one sync algorithm based at least on the obtained history.

(xiii). wherein selecting the at least one sync algorithm further comprises selecting at least one sync algorithm that is different than each of sync algorithms used in the history of attempts;

(xiv). wherein the player capabilities comprise frame accurate seek, and wherein calculating the sync player position further comprises: executing a seek to position process to calculate the sync player position; predicting a latency caused by a seek time required to complete reaching the calculated sync position; and calculating the sync player position based at least on the predicted latency;

(xv). wherein predicting the latency further comprises: executing at least one prediction algorithm; and predicting the latency based on the executed at least one prediction algorithm;

(xvi). wherein the at least one prediction algorithm is selected from a group comprising: bandwidth meter algorithm, average seek algorithm, and a deep learning algorithm;

(xvii). wherein the at least one prediction algorithm is selected based at least on the player capabilities;

(xviii). wherein the at least one prediction algorithm is selected based at least on computation complexity constraints;

(xix). wherein an attempt includes reaching of the player to a previously calculated sync player position using selected at least one sync algorithm, and a result of each attempt includes either success or failure to reach the sync player position, such that the player position is nearly synchronized with the reference position, and wherein selecting the at least one sync algorithm further comprises: obtaining a history of attempts and respective attempts results; wherein the at least one prediction algorithm is selected based on at least the obtained history;

(xx). the method further comprising: determining that the player cannot reach any calculated sync player position; transmitting to a reference server a failure notification;

(xxi). the method further comprising: in response to transmitting the failure notification, receiving an updated reference position; and applying the synchronization process with respect to the updated reference position;

(xxii). the method further comprising: determining that the user's device is out-of-sync by determining that the player position is not nearly synchronized with the reference position; and repeatedly: obtaining a normalized reference position in the content; and based at least on the obtained normalized reference position, applying the synchronization process to reach a calculated updated sync player position, such that the player position, when reaching the updated sync player position, is nearly synchronized with the reference position;

(xxiii). wherein the reference position is dynamically determined by a reference server.

According to another aspect of the presently disclosed subject matter there is provided a computerized method for facilitating a synchronized play of a content by a plurality of user devices joining a virtual shared watch room, wherein a reference position in the content is determined by a reference server and wherein each user device of the plurality of user devices performs the facilitating a synchronized play of a content by a user device's player.

According to another aspect of the presently disclosed subject matter there is provided a computerized system for facilitating a synchronized play of content by a user device's player, the system comprising a processing and memory circuitry (PMC) configured to:

receive a reference position in the content;

retrieve a player position in the content; and
based on the received reference position and the retrieved player position:
determine if the player position is nearly synchronized with the reference position; and
if in the negative, apply a synchronization process to reach a calculated sync player position, such that the player position, when reaching the sync player position, is nearly synchronized with the reference position.

According to another aspect of the presently disclosed subject matter there is provided a non-transitory computer readable storage medium tangibly embodying a program of instructions that, when executed by a computer, cause the computer to perform a method for facilitating a synchronized play of content by a user device's player, the method comprising:
receiving a reference position in the content;
retrieving a player position in the content; and
based on the received reference position and the retrieved player position:
determining if the player position is nearly synchronized with the reference position; and
if in the negative, applying a synchronization process to reach a calculated sync player position, such that the player position, when reaching the sync player position, is nearly synchronized with the reference position.

The system and the non-transitory computer readable storage medium disclosed in accordance with the aspects of the presently disclosed subject matter detailed above can optionally comprise one or more of features (i) to (xxiii) listed above with respect to the method, mutatis mutandis, in any technically possible combination or permutation.

According to another aspect of the presently disclosed subject matter there is provided a content sharing system for facilitating a synchronized play of content by players of a plurality of user devices, the content sharing system, comprising:
a reference server configured to manage a virtual shared watch room and to determine a reference position in the content; and
a plurality of user devices, wherein each of the user devices is configured to:
receive the reference position in the content;
retrieve a player position in the content; and
based on the received reference position and the retrieved player position:
determine if the player position is nearly synchronized with the reference position; and
if in the negative, apply a synchronization process to reach a calculated sync player position, such that the player position, when reaching the sync player position, is nearly synchronized with the reference position.

According to another aspect of the presently disclosed subject matter there is provided a computerized method for facilitating a synchronized play of content by players in at least two user devices, the method comprising:
by a processor of a reference server:
setting an initial reference position in the content in a virtual shared watch room;
receiving at least two requests from the at least two user devices to join the virtual shared watch room;
sending to each of the user devices a respective reference position in the content, the reference position being based at least on the initial reference position, thereby facilitating each of user devices to apply a synchronization process to reach a respective player position such that each player position is nearly synchronized with the reference position.

In addition to the above features, and to features (i) to (xxiii), the method according to this aspect of the presently disclosed subject matter can comprise one or more of features (a) to (j) listed below, in any desired combination or permutation which is technically possible:

a) wherein the virtual shared watch room is a dynamic shared watch room such that devices can join and leave the room at different times;
b) wherein the requests from different user devices of the at least two devices are received at different times;
c) wherein setting the initial reference position is based at least on a manifest type of the played content;
d) wherein setting the initial reference position is based at least on one protocol used by the players of the user device to play the content;
e) wherein setting the initial reference position is based at least on one platform used by the user device;
f) the method further comprising, repeatedly: updating the reference position in the content; and sending to the at least two user devices the updated reference position;
g) wherein updating the reference position is in response to receiving a failure notification from a user device of the at least two user devices, the failure notification being indicative that the player position in the user device is not nearly synchronized with the reference position;
h) wherein updating the reference position is in response to a manifest timeline change;
i) wherein updating the reference position is in response to receiving a request from at least one user device to update the reference position, the method further comprising: receiving a request from a user device of the at least one user device to update the reference position; and determining whether to grant the request; and updating the reference position if the request is granted;
j) wherein a manifest type of the played content is VOD or live, wherein determining whether to grant the request is dependent on the manifest type of played content.

According to another aspect of the presently disclosed subject matter there is provided a computerized system for facilitating a synchronized play of content by players in at least two user devices, the system comprising a processing and memory circuitry (PMC) configured to:
set an initial reference position in the content in a virtual shared watch room;
receive at least two requests from the at least two user devices to join the virtual shared watch room;
send to each of the user devices a respective reference position in the content, the reference position being based at least on the initial reference position, thereby facilitating each of user devices to apply a synchronization process to reach a respective player position, such that each player position is nearly synchronized with the reference position.

According to another aspect of the presently disclosed subject matter there is provided a non-transitory computer readable storage medium tangibly embodying a program of instructions that, when executed by a computer, cause the computer to perform a computerized method for facilitating a synchronized play of content by players in at least two user devices, the method comprising:

setting an initial reference position in the content in a virtual shared watch room;

receiving at least two requests from the at least two user devices to join the virtual shared watch room;

sending to each of the user devices a respective reference position in the content, the reference position being based at least on the initial reference position, thereby facilitating each of user devices to apply a synchronization process to reach a respective player position, such that each player position is nearly synchronized with the reference position.

The system and the non-transitory computer readable storage medium disclosed in accordance with the aspects of the presently disclosed subject matter detailed above can optionally comprise one or more of features (a) to (j) listed above with respect to the method, mutatis mutandis, in any technically possible combination or permutation.

According to another aspect of the presently disclosed subject matter there is provided a computerized method for predicting a latency of a player to execute frame accurate seek in a video, the method comprising:

executing at least one prediction algorithm selected from a group consisting of: bandwidth meter algorithm, average seek algorithm, and a deep learning algorithm; and predicting the latency based on the executed at least one prediction algorithm.

The method according to this aspect of the presently disclosed subject matter can further comprise the following feature: wherein the at the least one prediction algorithm is selected based at least on one of: player capabilities, computation complexity constraints, and history of attempts.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 11 illustrates a generalized flow chart of further operations performed in user device 150 in accordance with certain embodiments of the presently disclosed subject matter;

DETAILED DESCRIPTION

Figure 1:
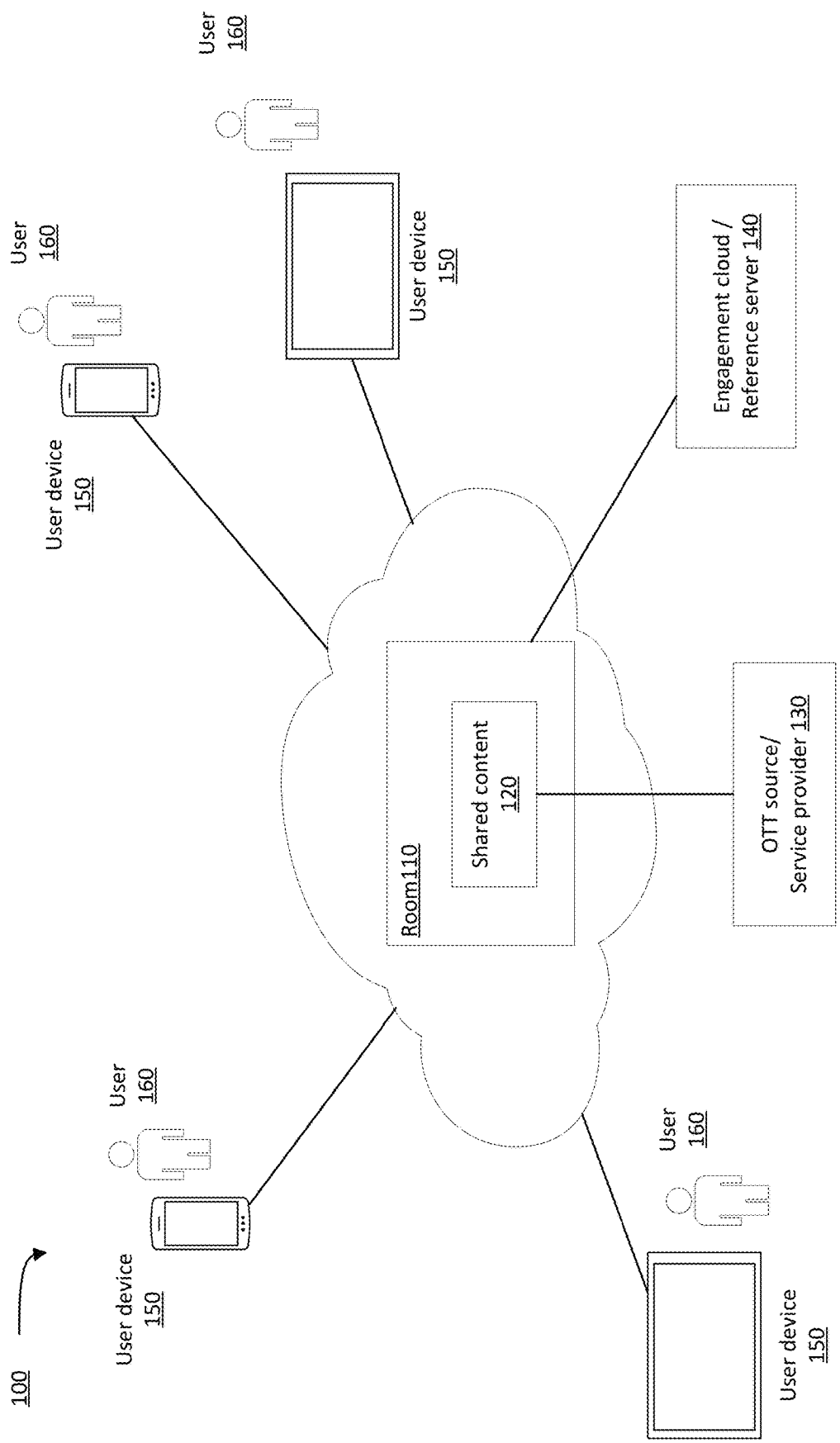
FIG. 1 illustrates a generalized diagram of a computerized content sharing environment 100 in accordance with certain embodiments of the currently presented subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "facilitating", "receiving", "retrieving", "determining", "applying", "calculating", "obtaining", "selecting", "reaching", "executing", "predicting", "transmitting", "setting", "sending", "updating", "pausing", "seeking", "sending", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including a personal computer, a server, a computing system, a communication device, a processor, or processing unit (e.g. digital signal processor (DSP), a microcontroller, a microprocessor, a field programmable gate array (FPGA), an application specific integrated circuit (ASIC), etc.), and any other electronic computing device, including, by way of non-limiting example, computerized systems or devices such as a reference server 140, a user device 150, and a service provider 130, PMC 210, and PMC 320 or SDK 320 disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes, or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof, describe non-limiting embodiments of the presently disclosed subject matter. Reference in the specification to "one case", "some cases", "other cases", or variants thereof, means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

Usage of conditional language, such as "may", "might", or variants thereof, should be construed as conveying that one or more examples of the subject matter may include, while one or more other examples of the subject matter may not necessarily include, certain methods, procedures, components and features. Thus, such conditional language is not generally intended to imply that a particular described method, procedure, component or circuit is necessarily included in all examples of the subject matter. Moreover, the usage of non-conditional language does not necessarily imply that a particular described method, procedure, component, or circuit, is necessarily included in all examples of the subject matter.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In order to enable a synchronized play of content, according to certain embodiments of the presently disclosed subject matter, a virtual shared watch room is established. The virtual shared watch room can enable a watch party of one or more user devices. In the virtual shared watch room, a room position (also referred to herein and below as "a reference position") is determined, e.g., by an external device, to that of the user device that wishes to play the shared content. The room position or reference position indicates a position of a reference server in a specific content at a specific time, with reference to a shared common clock. The clock can be synced by other external devices. For example, the position in a specific content can include a content frame, or a position which refers to start of the content (e.g., the start of the TV show, the movie, the song, the sports game). The specific time, with reference to a shared common clock, can be time according to an absolute clock, e.g. UNIX time, server's wall clock to which external devices can sync to, by implementing any other known methods for syncing between two devices. In some cases, the reference server can determine a reference position, and can send the determined reference position to other devices in order that they can sync. Based on the received reference position, including indication of the synced clock, external devices can, at any point, normalize the received reference position and determine the current room position. For example, a reference position received by the devices can be position 0 seconds in the specific football game content at time 8:00:00 pm absolute time (e.g., according to the UTC clock), meaning the room position was position '0' seconds in the content, indicative of frame '0' in the content at time 8:00:00 UTC. Within 10 minutes, the devices can calculate that the current reference position is "600,000 milliseconds (msec), at 08:10:00 UTC".

The room position, which is a single position for that established room, can be referenced by other devices that wish to join the room and play the content, in a manner that the devices can sync to the single room position within a pre-configured allowed latency. While referencing the room position, each of the devices can apply a synchronization process to facilitate the synchronized play of the content on the user device. The synchronized process can be different in each device, and can be determined based on various factors that are involved, including the content itself, the manifest of the content, or the protocol for obtaining the content of the type of the installed player and its capability, and previous learning attempts of the device to sync to a room. Establishing a room in a virtual environment, and setting a room position, such that each device can join and sync to the room and the room position, is advantageous, since synchronization can be achieved irrespective of the types and capabilities of the devices used by various users to play the shared content. Also, the synchronization process applied in one device is not related to the synchronization process applied in another device, yet, eventually, all devices are synchronized between themselves by synchronizing to the room position. Furthermore, since the synchronization process of one device is not related to another device, each device can apply the most suitable synchronization process which is the most efficient process for that particular device. Overall, synchronizing to room position improves user experience in playing a shared content by multiple separate devices in a synchronized manner.

As explained further below, another advantage of the synchronization process to a room, is the avoidance of interfering or modifying the content itself, thus being able to perform the synchronization process over any available content, provided in generic over the top (OTT) average bitrate (ABR) protocols.

During participation in the watch room, a user device can continuously monitor its synchronization to the room position, and apply the synchronization process every time the user device determines that it is out-of-sync. Also, the synchronization process can repeatedly be applied until reaching a synchronization with the room.

The single room position, which determines for all other devices how and when the content should be played, facilitates the synchronized playing of the content, as each user device needs to synchronize to a single reference position, to achieve a synchronized play among all devices. The room operator can be a reference server that establishes and manages the room, its position in the content, and the devices that joined the room. The reference server can dynamically change the room position to provide the shared content in a manner that optimizes user experience. For example, the reference server can update the room position in response to one of the users that wishes to change the position in the content that is played to all devices, or if one of the devices is unable to be synced to the room. The update of the room position entails the other user devices, which were synced with the room up until that time, to apply once again the synchronization process, to be synced to the updated room position.

It should be noted that while throughout the description, the watch party includes a shared play of content, it should not be regarded as limiting, and those skilled in the art will appreciate that playing a content, according to certain embodiments of the presently disclosed subject matter, can refer to any consumption of a shared content, including the delivery and/or display/presentation of content on a computerized device.

Bearing the above in mind, reference is made to FIG. 1 illustrating a generalized diagram of a computerized content sharing environment 100, in accordance with certain embodiments of the currently presented subject matter. The environment 100 aims to facilitate a synchronized play of content on a user device by virtually establishing a virtual shared watch room.

The environment 100 comprises several components which operatively communicate with each other. Environment 100 comprises a virtual established room 110, associated with a content 120 which is shared in the room 110. For example, the shared content 120 of the room 110 can be a football game. Room 110 can be a shared virtual environment, as established in known systems, e.g., using a standard API for establishment of a room/creation of a channel. The room 110 can maintain a room position. The room position (reference position) can be sent to devices. In some cases, the reference position can be determined by an external device and can be updated. As explained, the reference position indicates a reference server in a specific content at a specific time, with reference to a shared common clock, or a clock which can be synced to by external devices so they can sync to. In some examples, the shared clock and time can be synced to using Network Time Protocol (NTP). A reference position can include a room position comprising a content frame, a position in reference to start of the content (e.g. the start of the TV show, the movie, the song, the sports game), with reference to the absolute time (e.g., Absolute UNIX time). As illustrated above, the reference position can be position 0 seconds in the specific football game content at time 8:00:00 pm UTC clock. The absolute time can be referenced by external devices, such as user devices 150. In some examples, the user devices 150 participating in the watch party and which join the room 110, are synced to this shared absolute time, within a tolerance of e.g., a few 10s of msec, e.g., within 1-2 frames of content. It should be noted that the room 110 does not necessarily play the content 120. Instead, the room 110 can be associated with shared content 120, while the reference position is indicative of the position of the room 110 in the content 120, i.e., the point in the content 130 that would have been played at a specific time, should the content have been played at the room 110.

In some cases, a user 160 that wishes to play a shared content 120 on one or more of his devices, can join the room 110, e.g., by a user device 150 joining the room 110. User device 150 can be any computerized device having a memory and processing capabilities, communication capabilities, and a player capable of playing content 120, e.g., a mobile device such as a smartphone, tablet or laptop computer, television (TV) etc. The user device 150 can comprise an app facilitating shared consumption of a content. For example, the app has user interface screens such as "choose a TV show to watch", "invite friends to watch with me", "chat/message with my friends during the viewing" etc. Pressing the links in the app can result in user device 150 joining established room 110. The content 120 to be shared in the room can be a content created by an over the top (OTT) source also to be referred to as service provider 130 comprised in environment 100. For example, the content 120 can be a sports game, a movie, TV show, or an audio content. The content can be obtained by user device 150 e.g., by subscribing to a channel dedicated for a specific content 120 when joining the room 110.

The room 110 can be managed by an engagement cloud, also to be referred to as a reference server 140 comprised in environment 100. Reference server 140 can be any computerized device having a memory, processing capabilities and communication capabilities. Reference server 140 can be configured to manage the room 110, including managing the reference position of the room 110 and communicating with user devices 150 that join the room 110.

With reference to environment 100, in some cases, in order to facilitate a synchronized play of content 120, e.g., a live football game, by the user device 150, a dedicated room 110 is established. The room 110 is associated with the football game content. Reference server 140 is configured to set an initial reference position in the football game, such as position 0 seconds at time 8:00:00 pm, absolute time (e.g., UTC time), which is identical to the time that the live broadcast of the football game begins. A group of friends, representing users 160, wish to watch the football game together, each with his user device 150. Hence, each of the friends, using their own user device 150, requests room 110 to join, e.g., using a dedicated app on user device 150. The request to join the room 110 can be sent to reference server 140 which can grant the request. Once granted, reference server 140 is configured to send to each user device 150 the reference position of the room 110, e.g. position 0 seconds in the football game at 8:00:00 pm, UTC. Each user device 150 can further obtain the shared content 120, the football game, e.g., by subscribing to a channel in room 110 or by obtaining it from the service provider 130 using a dedicated content sharing app. Once the football game or a part thereof (e.g., if the football game is live) or data indicative of the football game is received/obtained by the player in user device 150, user device 150 further retrieves the player position in the received football game. Based on the received reference position and the retrieved player position, the user device 150 determines whether the player position is nearly synchronized with the reference position. For example, the user device 150 can calculate a distance between the reference position and the player position, and determines whether the user device meets a threshold distance. The threshold distance can be a parameter which indicates the maximum distance in time which the user device 150, when participating in a watch room party in room 110, should have from the reference position set by room 110. If the user device 150 determines that player position is not nearly synchronized with the reference position, e.g., since the distance exceeds the pre-configured threshold, then user device 150 can apply a synchronization process. The purpose of the synchronization process is to reach a position in the content 120 such that the player position and the reference position are nearly synchronized, e.g., that the distance between the positions does not exceed the pre-configured distance threshold. In order to do so, the player can reach a position in the content, where the player estimates that, at that position, the player position will be nearly synchronized with the room position. Therefore, the player can calculate a sync player position that it can reach, such that the player position, when reaching the sync player position, will be nearly synchronized with the reference position. Further details of how to calculate a sync player position are detailed below with respect to FIGS. 7-9.

Figure 2:
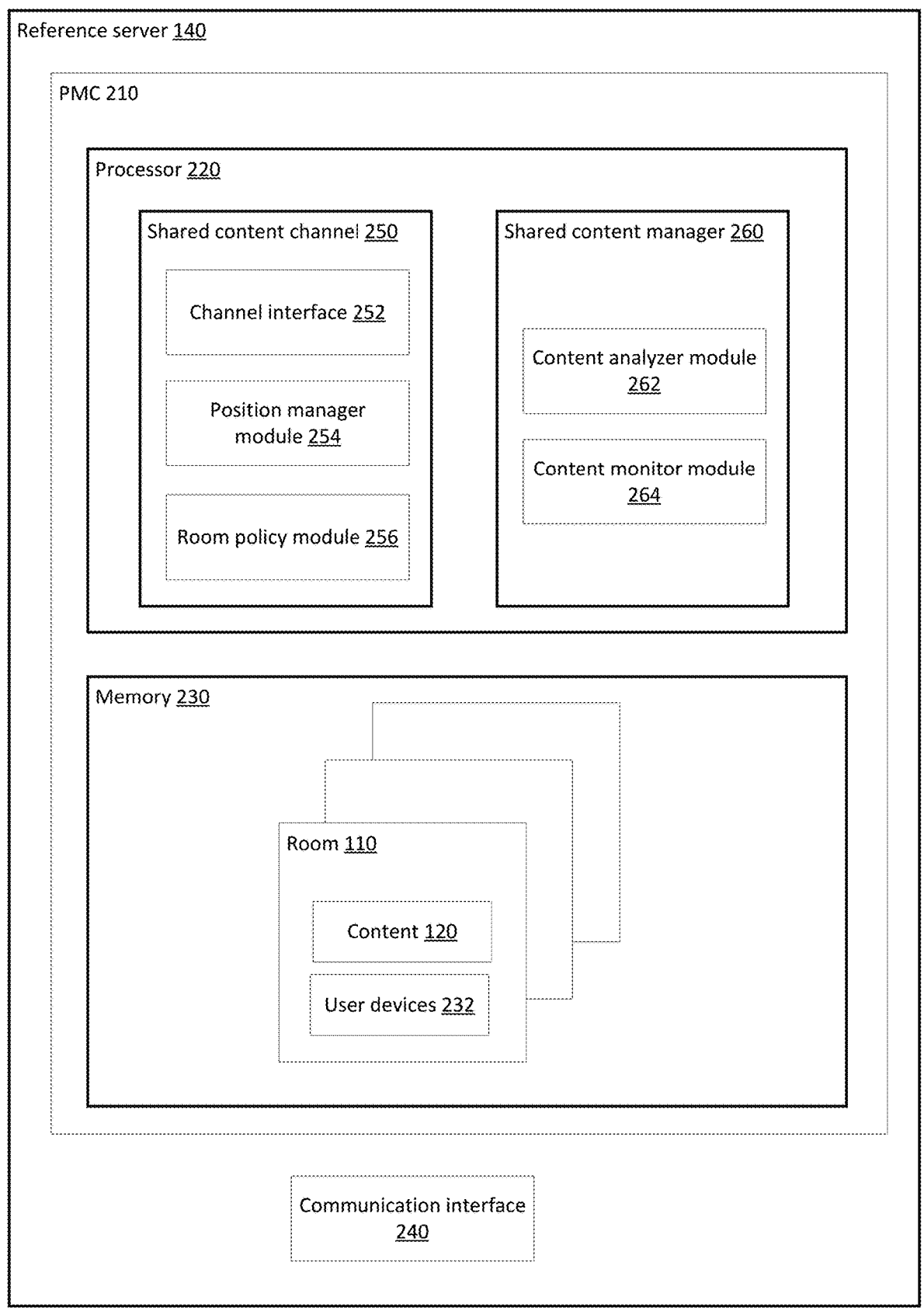
FIG. 2 illustrates a functional block diagram of the reference server 140 in accordance with certain embodiments of the presently disclosed subject matter.

Reference is now made to FIG. 2 illustrating a high-level functional block diagram of the reference server 140, in accordance with certain embodiments of the presently disclosed subject matter. The illustrated reference server 140 includes a processor and memory circuitry (PMC) 210 comprising a processor 220 and a memory 230. Reference server 140 further comprises a communication interface 240 enabling reference server 140 to operatively communicate with external devices, such as user devices 150 and service provider 130. The processor 220 is configured to execute several functional modules in accordance with computer-readable instructions implemented on a non-transitory computer-readable storage medium. Such functional modules are referred to hereinafter as comprised in the processor 220. The processor 220 can comprise shared content channel 250 and shared content manager 260. Shared content channel 250 can be a backend microservice that is configured to manage the room 110, the room position, and facilitate synchronization between the user devices 150 that joined the room 110. Shared content channel 250 comprises channel API module 252, position manager module 254, and room policy module 256. Channel interface 252 can be an API layer that is configured to operatively communicate with both the user devices 150 and additional backend services such as position manager module 254 and room policy module 256. Position manager module 254 is configured to manage the room position including setting the room position, e.g., based on different inputs such as shared content creation, various manifest types (VOD or live), manifest DVR window, VOD duration, capabilities of user devices 150 that joined the room 110, user position control, such as the ability of the user to influence the room position, and content monitoring. When setting a new reference position for room 110, or when updating the reference position, position manager module 254 can send the updated reference position to user device 150 e.g., using the channel interface 252, such that the player can receive an updated reference position to refer to. Room policy module 256 is configured to determine whether a specific event occurred in environment 100 should trigger re-calculating the reference position to accommodate the event. This may occur, for example, if user device 150 is not able to sync to the room position 110, e.g., since the play is too close to the live broadcast. The user device 150 can trigger an event of out-of-sync. The event is communicated to room policy module 256. In such a case, room policy module 256 can determine to update the room position to be further back from live, or to determine that this user device 150 remains out-of-sync.

Shared content manager 260, also comprised in processor 220, can be a backend microservice configured for analyzing and monitoring one or more shared contents 120 currently used in one or more rooms 110. Shared content manager 260 comprises content analyzer module 262 and content monitor module 264. Content analyzer module 262 is configured to analyze new content 120, identify average bitrate (ABR) protocol (such as HLS or DASH), identify manifest type (such as VOD or live), and create content metadata required by the shared content channel 250 (such as segment list and protocol conversion formula). Data generated or analysis by content analyzer module 262 can be used e.g., by position manage module 254, to set a reference position, or to update it. Content monitor module 264 is configured to continuously monitor the shared content 120 and identify changes, such as timeline change, that will be required to update the shared content channel 250 and position manage module 254.

PMC 210 further includes memory 230. Memory 230 may store data pertaining to one or more rooms 110 that were established. Each room 110 may be associated with one or more content 120 shared in that room 110, and may include data indicative of the content 120 (not shown) such as content state (pause e.g. when speed is '0'/play (play at normal speed or at a different scale), manifest type etc. Room 110 can also include data indicative of one or more user devices 232, such as the user device 150, that joined the room 110 or is trying to join the room 110.

Figure 3:
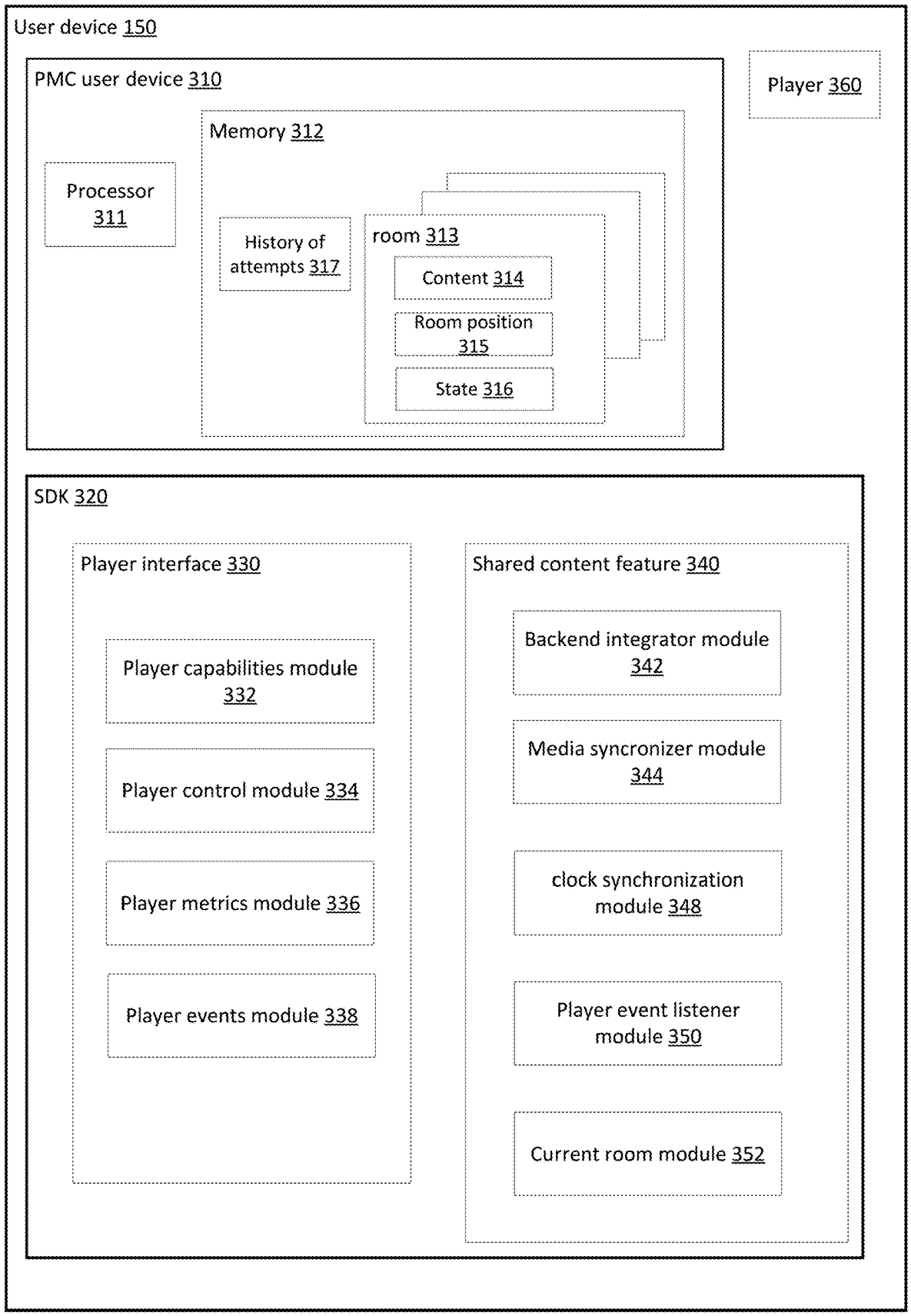
FIG. 3 illustrates a functional block diagram of the user device 150 in accordance with certain embodiments of the presently disclosed subject matter.

Reference is now made to FIG. 3 illustrating a high-level functional block of user device 150, in accordance with certain embodiments of the presently disclosed subject matter. The illustrated user device 150 includes a processor and memory circuitry (PMC user device) 310 comprising a processor 311 and a memory 312. Memory 312 can store data indicative of one or more rooms 313 to which the user device 150 joined or is trying to join, such as one or more rooms 110 established by reference server 140. Each room 313 can be associated with the shared content 314 of the room, room position 315, and state of content 316 by the reference (e.g., pause/play). In some examples, data indicative of content 314, room position 315, and content state 316, can be received from reference server 140. Memory 312 may further comprise a history of attempts 317 storing previous attempts of the player 360 to reach synchronization, either in the current room 313, or general learns attempts in previous synchronization attempts. The history 317 is further described below.

User device 150 may further comprise additional standard components of a computerized device for ordinary usage of a user, such as components of a standard user smart device. User device 150 may comprise software development kit (SDK) 320 and a player 360. The player 360 can be a standard player installed in a user device, and can be of various types, according to the type of the user device 150, such as ExoPlayer on Android, AVPlayer on iOS and tvOs and HLS.js on HTML5. SDK 320 can comprise player interface 330 and shared content feature 340. The processor 311 is configured to execute functional modules of SDK 320, such as comprised in player interface 330 and shared content feature 340, in accordance with computer-readable instructions implemented on a non-transitory computer-readable storage medium. Such functional modules are referred to hereinafter as comprised in the processor 320 or in the SDK 320.

Player interface 330 is configured to provide the SDK 320 with access to the underlying designated player 360. Player interface 330 can be an interface implemented for various types of players (ExoPlayer, AVPlayer, HLS.JS). Player interface 330 can comprise player capabilities module 332, player control module 334, player metrics module 336, and player events module 338.

Player capabilities module 332 is configured to expose optional player 360 capabilities, such as:
Frame accurate seek, as known in the art;
Play at speed, including the capability of speeding up or slowing down the original speed of audio or video content;
Controlled buffer size (how much time the player is buffering before starting to play);
Bandwidth meter including player estimation for available bandwidth.

Player control module 334 is configured to expose control functions of the player 360, such as:
Play
Pause
Seek
Player metrics module 336 is configured to expose player metrics. Player metrics include at least:
Current position
Current download bandwidth
Current Bitrate played Start play buffer size Player events module 338 is configured to expose registration to player events. Player events module 338 can trigger player events to any subscribed event listener. The events can include for example:

Player state (buffering, ready)
re-buffering event
Stream state (playing, speed, BOS, EOS)

Shared content feature 340 is configured to provide the SDK 320 with client side of shared content synchronization functionality. Shared content feature 340 comprises backend integrator module 342, media synchronizer module 344, clock synchronization module 348, player event listener module 350, and current room module 352. Backend integrator module 342 is configured to call backend APIS and listen to backend events, and, in some examples, update room 313 (including e.g. receive data which pertains to subscription to shared content channel, set position of device, room position changed, play state changed).

Media synchronizer module 344 is configured to create the synchronization algorithm sequence, control the synchronization flow, and monitor synchronization status. Further details of media synchronizer module 344 are described with reference to FIG. 6. Clock synchronization module 348 is configured to synchronize the SDK wall clock with the reference clock, e.g. using NTP protocol. Player event listener module 350 is configured to subscribe to player events, and provide information to both media synchronizer module 344, required for its operation and accuracy. Current room module 352 is configured to obtain, e.g., from reference server 140, data pertaining to a current room that the user device 150 has joined, or is trying to join. The data obtained can be stored in room 313.

Figure 4:
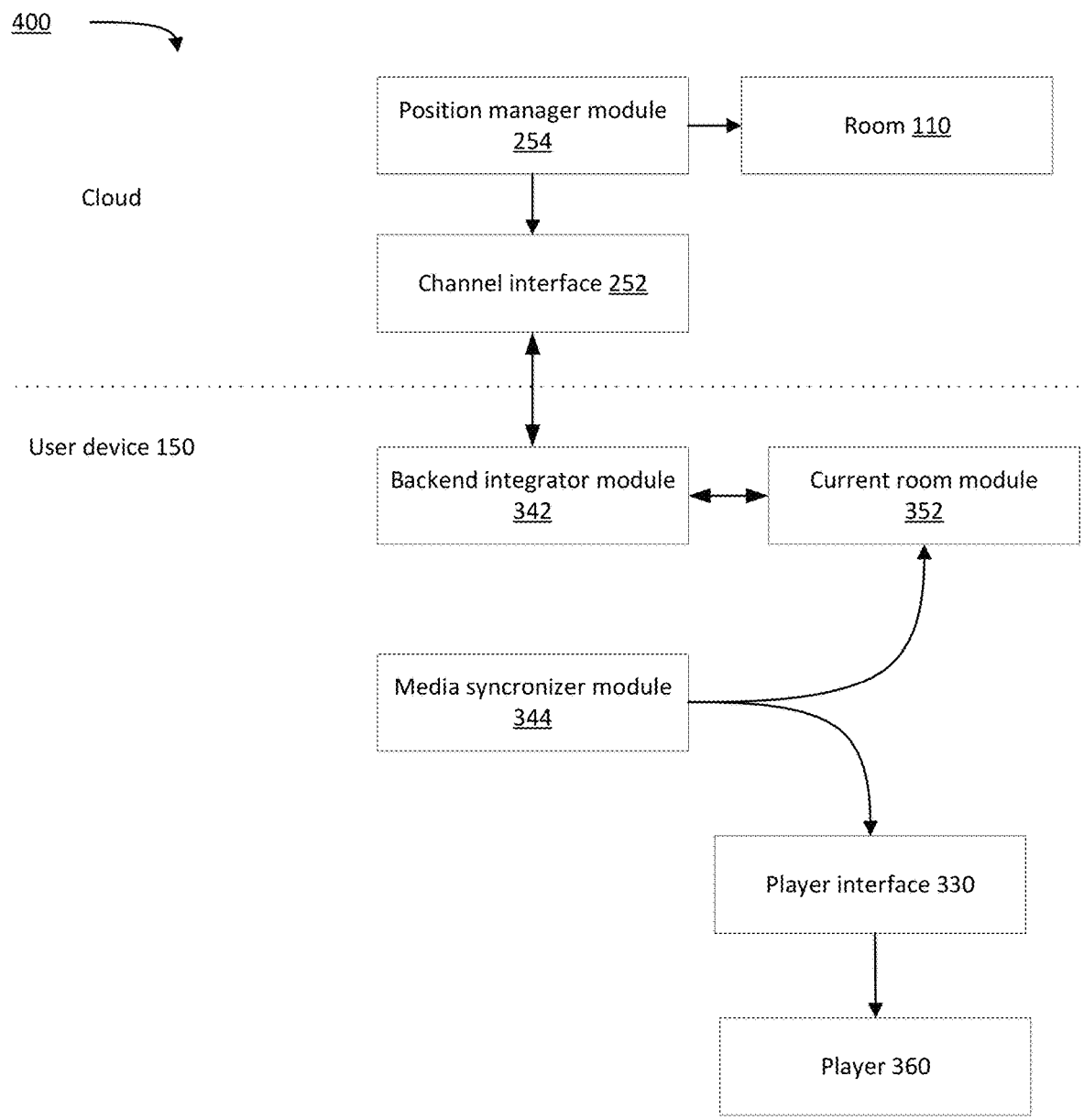
FIG. 4 illustrates an exemplary architecture of components in environment 100 in accordance with certain embodiments of the presently disclosed subject matter.

Reference is now made to FIG. 4 illustrating an exemplary architecture 400 of components of reference server 140 and user device 150 in environment 100, and communication between these components, in accordance with certain embodiments of the presently disclosed subject matter. In some cases, room 110 is established at the cloud, and position manager module 254 is configured to manage the room 110 from the reference server 140 end. Position manager module 254 can interface with the SDK 320 running on the user device 150, e.g. through the API player comprising channel interface 252 on the reference server 140 end, and a backend integrator module 342 (backend APIS) at the user device 150 end. After user device 150 joins the room 110, position manager module 254 can send and receive information to and from user device 150 pertaining to the room 110 including e.g., sending to the user device 150 the reference position, and updating user device 150 when the reference position has changed, and receive from the user device 150 when the user device 150 has joined the room 110. Media synchronizer module 344 can interface with the room 110, e.g. through the channel interface 252, with the assistance of current room module 352, to obtain the room position and content state (e.g. pause/play) and can interface with the player 360 through player interface 330 to obtain player position, state and capabilities.

Figure 5:
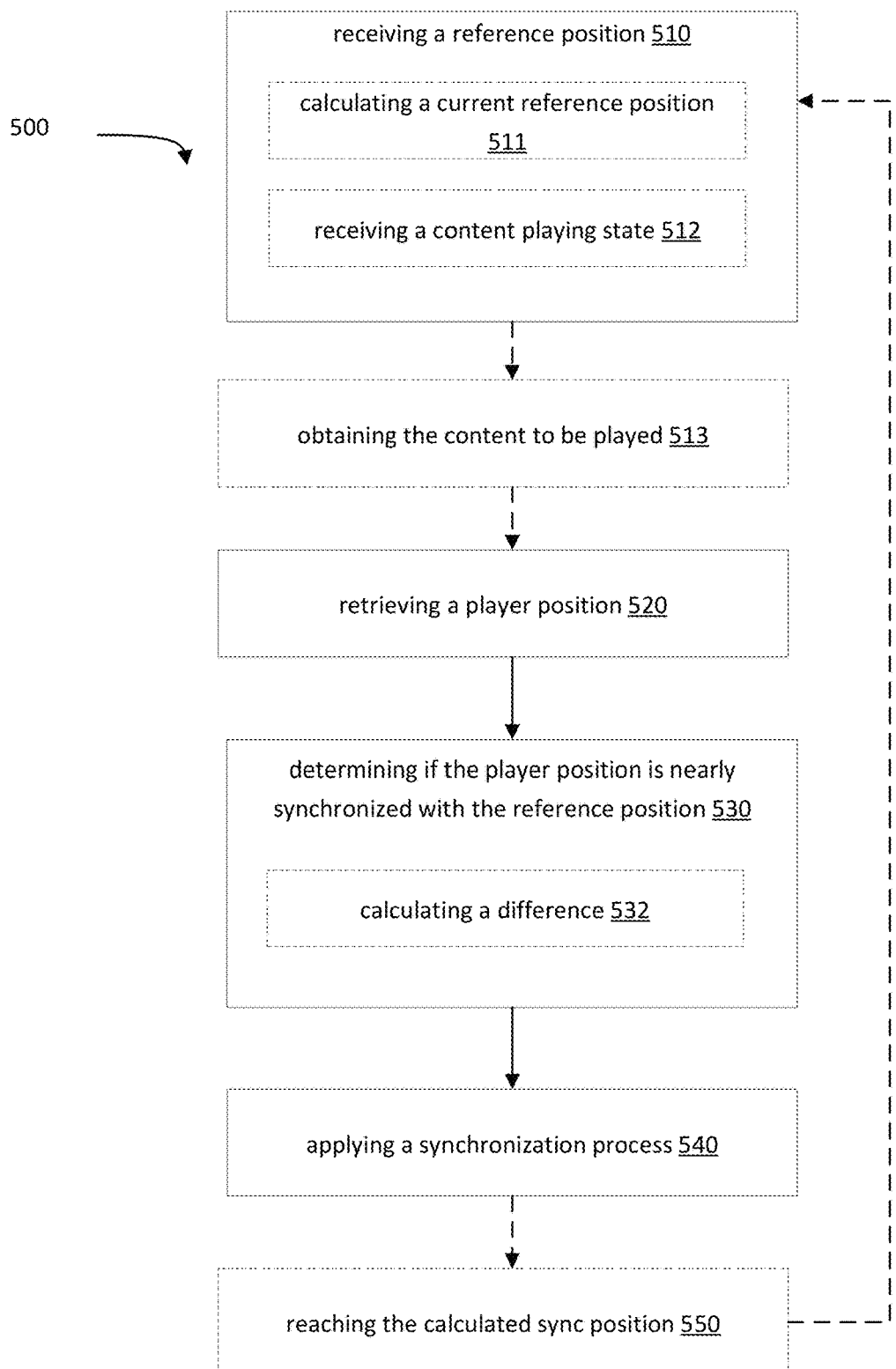
FIG. 5 illustrates a generalized flow chart of operations performed in user device 150 in accordance with certain embodiments of the presently disclosed subject matter.
Figure 6:
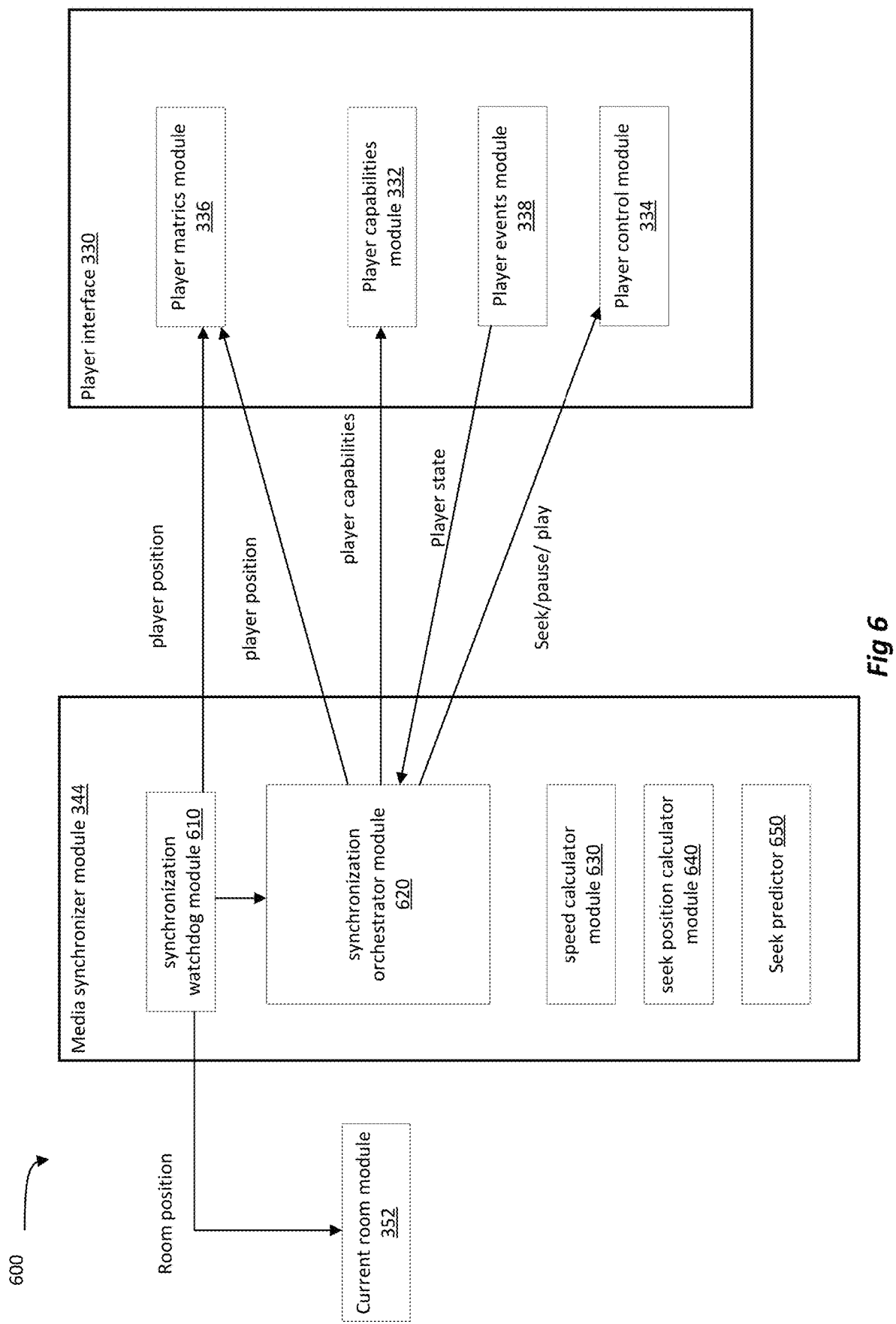
FIG. 6 illustrates a functional block diagram of the media synchronizer module 344 in accordance with certain embodiments of the presently disclosed subject matter.

Referring to FIG. 5, there is illustrated a generalized flow chart of operations performed in user device 150 in accordance with certain embodiments of the presently disclosed subject matter. The following flowchart operations are described with reference to elements of user device 150 and reference server 140. However, this is by no means binding, and the operations can be performed by elements other than those described herein. Also, reference is made to FIG. 6 illustrating a functional block diagram of the media synchronizer module 344 in SDK 320 in accordance with certain embodiments of the presently disclosed subject matter. The description of the operations in FIG. 5 are interchangeably described with reference to elements of media synchronizer module 344. Media synchronizer module 344 comprises synchronization watchdog module 610, synchronization orchestrator module 620, speed calculator module 630, seek position calculator module 640, and seek predictor 650. Details of these components are described further below.

With reference to the illustrated example of a group of friends that wish to view the football game, it is desired that the game is played on the devices of the friends in a synchronized manner. In order to facilitate the synchronized play of game, a room 110 can be established, where the room 110 is associated with the content 120 being the football game. Reference server 140, e.g., using position manger module 254, can set the initial reference position, such that a user device 150 that wishes to join the room and play the game in a synchronized manner, can sync to the set reference position. Reference server 140 can receive a request from a user device 150 to join the room 110 and can send the reference position to the user device 150.

User device 150 can send a request from reference server 140 to join a watch party, by joining room 110, and can receive the reference position set by the reference server 140. Media synchronizer module 344, comprised in the user device 150, can continuously run while the user device 150 participates in the watch party. Whenever media synchronizer module 344 detects that the player 360 of the user device 150 is out-of-sync with the position of the room 110, media synchronizer module 344 starts to execute the synchronization sequence. In some examples, media synchronizer module 344 can execute the synchronization sequence when first receiving the reference position when joining the room 110. Alternatively, or additionally, media synchronizer module 344 can continuously run while the user device 150 participates in the watch party, and execute the synchronization sequence whenever it detects that the player 360 is out-of-sync with the room position.

With reference to FIG. 6, in some cases, synchronization watchdog module 610 is configured to verify that the player is synchronized to the room 110, and, optionally, trigger the synchronization process, e.g. with the assistance of the synchronization orchestrator module 620, when synchronization watchdog module 610 detects that the player it is out-of-sync with the room position. In some examples, synchronization watchdog module 610 may be activated once the user device 150 joins the room and, optionally, subscribes to a channel e.g. a channel dedicated to a specific content 120, e.g. through communicating with shared content channel 250 in the room 110. Synchronization watchdog module 610 is configured to communicate with current room module 352 to receive data pertaining to the room 110.

In order to facilitate a synchronized play of content 120 by a user device's player 360, media synchronizer module 344, e.g. by watchdog module 610, can receive a reference position in the content 120 (block 510 in FIG. 5), e.g. from current room module 352 which may obtain the data pertaining to a current room 110 from the reference server 140. In some examples, the watchdog module 610 obtains the data when the user device 150 initially joins the room 110. Alternatively or additionally, the watchdog module 610 may be triggered periodically to read the current room position and state from the current room module 352 in order to monitor whether the player 360 is nearly synchronized or out-of-sync with the room position.

In some examples, the received reference position includes data indicative of the reference position in the content 120 at a certain identified time e.g., absolute time, or server clock to which the user device is synced to.

Based on the received reference position, watchdog module 610 can normalize the received reference position to calculate a current room position (block 511). For example, if the reference position includes data indicative that at 8:00:00 the room position was set to 0 msec at content 120 and state is play in speed 1, then in case the user device 150 joins the room at 8:00:05, the normalized position, e.g. the current room position, would be the position in the reference plus the time passed, meaning 5000 msec at 8:00:05. If the play state is paused (as explained below), the current room position would be 0 msec at 8:00:05. It is to be noted that the normalized reference position is indicative of the current room position, sometimes, based on the state of the content (play/pause). Calculating the normalized reference position is advantageous, since external user device 150 can calculate the current room position, irrespective of when the initial reference position was determined, sent or received at the user device by the reference server 140 or normalized by them. As explained further below, in some examples, if the user device 150 does not reach synchronization with the reference position after applying a synchronization process, then the user device is able to re-calculate the normalized room position, irrespective of how much time has lapsed, since it was sent from the reference server.

Determining whether the player 360 is nearly synchronized with the reference position can be based on the calculated current reference position, the normalized reference position.

In some examples, receiving the reference position comprises receiving a content playing state (block 512). The content playing state can be e.g., pause, play, or speed play. The content playing state may be indicative of the state of the content in the room 110, e.g. whether the reference position is progressing along the content (e.g. is progressing in the frames of the content), or whether the content is paused at the room 110. Receiving the content playing state can assist watchdog module 610 to determine a current reference position. For example, the current reference position, calculated when the content playing state is paused, is different from the current reference position calculated when the content playing state is speed play. If it is determined that the player 360 is out-of-sync, then the synchronization process can be applied based at least on the received content playing state. Further details on how to apply the synchronization process, based on the received content playing state, are described further below.

If the user device 150 has just joined a room 110 and subscribed to a channel, user device 150 may further obtain e.g., by subscribing to the channel and receiving from the service provider 130, the content 120 to play (block 513). The content 120 may be the shared content associated with the room 110. Once the content 120 is received and is played/loaded to the player 360, watchdog module 610 may retrieve a player 360 position in the content (block 520). For example, with reference to FIG. 6, player metrics module 336 can expose the player 360 metrics including at least the current position of the player in the content, the current download bandwidth, the current bitrate played, and the start play buffer size. Based upon at least some of the data obtained by player metrics module 336, such as the current player position and the state (play/pause), watchdog module 610 can determine whether the player position is nearly synchronized with the reference position (block 530). In some examples, in order to determine whether the player position is nearly synchronized with the reference position, watchdog module 610 can calculate a distance between the reference position and the player position (block 352). If the calculated distance does not exceed a pre-configured threshold, then the watchdog module 610 can determine that the player position is nearly synchronized with the reference position. For the sake of clarity, the term "nearly synchronized" may be used herein to imply the possibility of an allowed tolerance in the position of the player in the device and position of the room. The allowed tolerance ensures that each user, when playing the content on its user device, will hear and see the same events in the content, e.g., a goal in the game, at sufficiently close points in time, such that it will not be discernible that they did not experience the goal at different times. This allowed tolerance is bound by a pre-configured threshold, where the threshold is small enough to keep synchronized play of the content according to the room position, while being tolerant to some latency between the two systems, the room 110, and the user device 150. The pre-configuration of the threshold is advantageous, since if a plurality of user devices 140 join room 110, and each of the user devices 150 is nearly-synchronized with the room 110, such that the distance between the player position of each of the user devices 150 and the room position does not exceed a pre-configured threshold, this entails that all user devices 140 in the room 110 are nearly synchronized with each other.

In some examples, the pre-configured threshold can be [−50,50] msec, such that the distance between the player position and the normalized reference position is within the range of [−50,50] msec. The distance can be calculated by subtracting the position in the content of the player from the position in the content of the normalized reference position. To illustrate this, consider an example where the reference position is 10000 msec at 8:00:00 at play speed 1. At current time of 8:00:05, the normalized position is 15000 msec. A valid player position such that is nearly synchronized with the reference position within the allowed threshold, should be within the range of [14950,15050].

If watchdog module 610 determines in the negative, i.e., that the player position is not nearly synchronized with the reference position, then, with reference to FIG. 6, it may trigger synchronization orchestrator module 620 to apply a synchronization process (block 540 in FIG. 5). In some examples, the desired result of applying the synchronization process is to reach, at a future time, a calculated sync player position. In some examples, the term a 'sync player position' should refer to a calculated estimated position of the content, such that when reached by the player 360 after applying a sync algorithm, the player position will be nearly synchronized with the reference position.

The user device 150 aims to play the content 120 by the player 360, in a nearly synchronized manner to that indicated by the room 110 in the reference position. If the player 360 is not synchronized, the user device 150 aims to move the player to a position in the content where it will be synchronized with the reference position. As such, the user device 150 may select one or more sync algorithms to apply. Based on the selected sync algorithm, to calculate a sync player position and to reach the sync player position (block 550). Further details of applying a synchronization process (block 540) appear below with reference to FIG. 7.

Once the player 360 reaches the sync player position, watchdog module 610 can determine whether the player position is now nearly synchronized with the reference position. There may be several reasons for the player 360 to remain out-of-sync, despite the selection of a sync algorithm to apply, calculating the sync player position, and reaching the calculated sync player position. For example, failure can occur in reaching the sync player position e.g., if the sync algorithm did not work as expected, and the player 360 did not reach the calculated sync player position, or if the player 360 did reach the calculated sync player position, yet the reference position made further progress, and the current player position is not nearly synchronized with the reference position. Other examples of being out-of-sync can include using seek estimation based on bandwidth meter (BW meter) when the network is very unstable, such that estimation of buffering time is inaccurate, such that calculated sync player position is inaccurate. In case watchdog module 610 determines that the player position is not nearly synchronized with the reference position, the synchronization orchestrator module 620 can repeatedly apply the synchronization process, until the player position is synchronized with the reference position (this is shown by the dashed line in FIG. 5 from block 550 to block 510). Further details of reaching the calculated sync player position are described with reference to FIGS. 7-10. Also, further details of repeatedly applying the synchronization process appear below.

Figure 6A:
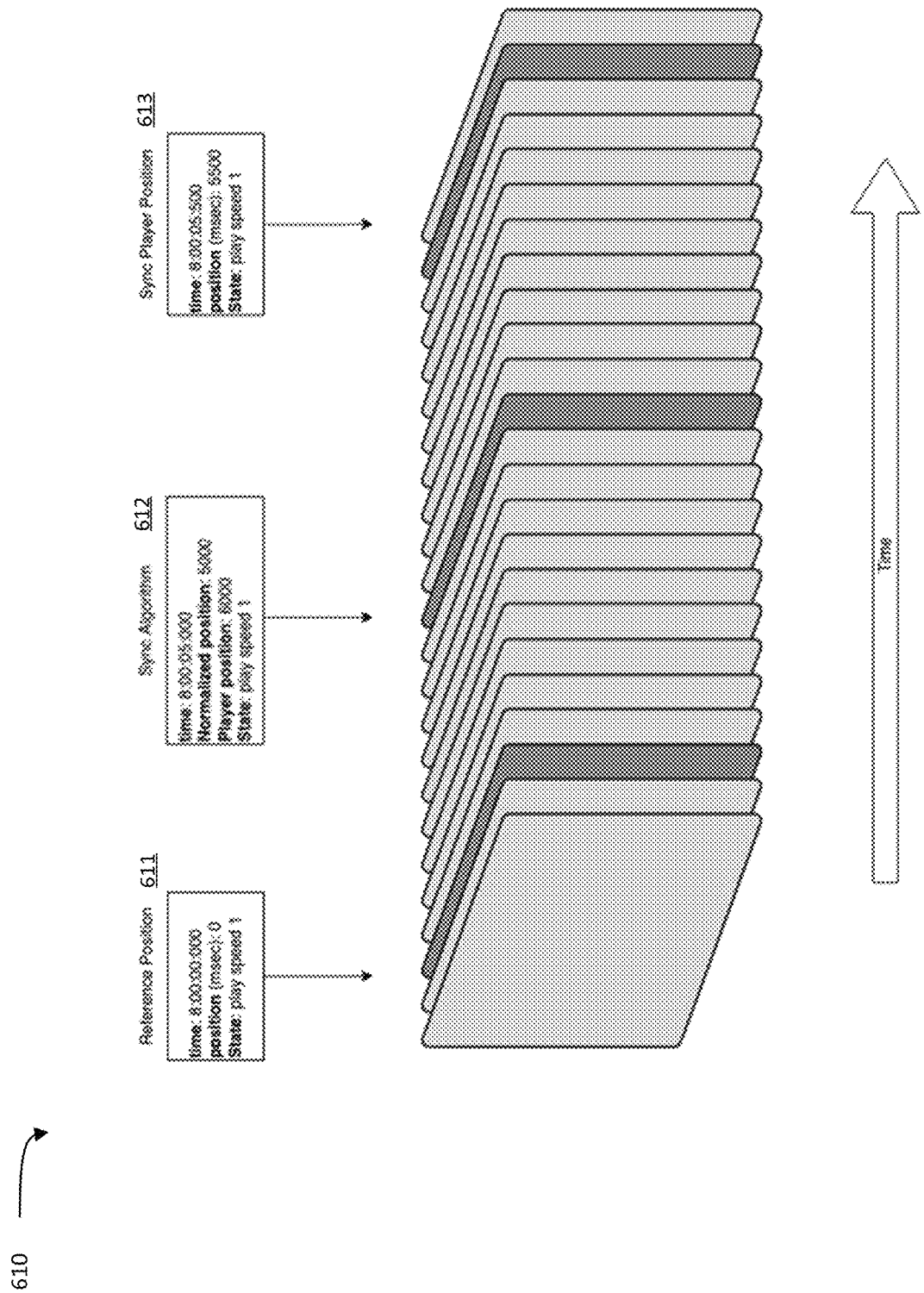
FIG. 6A illustrates an example of a timeline of content in accordance with certain embodiments of the presently disclosed subject matter.

Reference is made to FIG. 6A illustrating an example 610 of a timeline of content, with reference position as received as indicated in 611, the player position and calculated normalized reference position as indicated in 612, and sync player position as indicated in 613. To illustrate the example above, the reference position received by the user device 150 includes a reference position of 0 msec at 8:00:00:000 while play speed is 1. The user device 150 can normalize the received reference position to determine the current room position, and reach a normalized room position of 5000 at time 8:00:05:000. The current player position in the content is 6000 at time 8:00:05:000. Based on these positions, and assuming it takes the player 500 msec to seek to a particular position in the content, a sync algorithm can be determined, and a sync player position can be calculated to be 5500 at 8:00:05:500. It is assumed that the reference position will also be 5500 at time 8:00:05:500, hence the player will be nearly synchronized with the reference position.

As described further below with respect to FIG. 11, in case it is determined that the player position is not nearly synchronized with the reference position after reaching the sync player position, synchronization orchestrator module 620 can apply several sync algorithms to reach the calculated sync player position.

Figure 7:
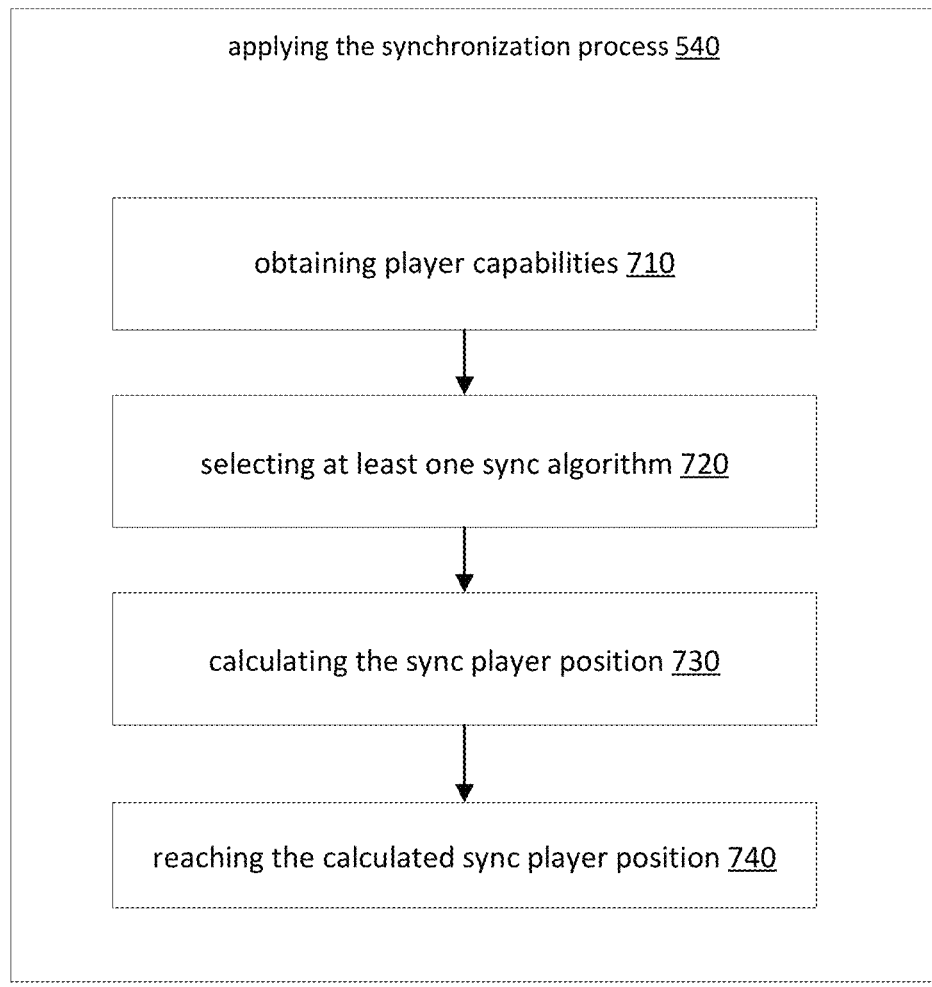
FIG. 7 illustrates a flow chart of operations comprised in applying the synchronization process, in accordance with certain embodiments of the presently disclosed subject matter.

Reference is now made to FIG. 7 illustrating operations comprised in applying the synchronization process (block 540 in FIG. 5), in accordance with certain embodiments of the presently disclosed subject matter. In some examples, in order to apply the synchronization process, synchronization orchestrator module 620 may select, from several available sync algorithms, which sync algorithm is optimal for reaching synchronization. In order to select, synchronization orchestrator module 620 may first obtain capabilities of the player 360 (block 710), e.g. using player interface 330 and player capabilities module 332. Player capabilities module 332 is configured to expose optional player capabilities of player 360 to synchronization orchestrator module 620, such as play at speed, frame accurate seek, controlled buffer size and bandwidth meter, control of average bitrate (ABR) profiles and control of player buffering sizes, or a combination thereof. Each capability of the player 360 capabilities may assist the synchronization orchestrator module 620 to reach a sync player position. The player capabilities are further described below. Player control module 334 is configured to expose control functions of player 360 to synchronization orchestrator module 620, such as: Play, Pause and Seek.

Based on the obtained player capabilities, the player position and the reference position, synchronization orchestrator module 620 may select a sync algorithm to apply (block 720). In some examples, synchronization orchestrator module 620 selects more than one sync algorithm to apply, optionally, to be applied in a sequential manner. In some examples, the sync algorithms are selected from a group consisting of: 'play at speed', 'seek and pause', 'seek to position', or a combination thereof.

Once the sync algorithm is selected, synchronization orchestrator module 620 can calculate a sync player position (block 730). It should be noted that the sync player position should refer to a calculated estimated position of the reference of the content, such that when reached by the player 360 after applying a sync algorithm, the player position will be nearly synchronized with the reference position. It should be noted that the sync player position is indicative of an estimated position that the reference server will reach in the content, at a certain time. The reference position itself is not changed or influenced by the calculation.

The sync player position can be calculated based on the selected sync algorithm. As exemplified above with respect to reference position being 300 msec at time 8:00:00 and the player position being 150 msec at time 8:00:00, assuming that the player capability includes play at speed, the sync player position could be calculated to be at position 450 msec at 8:01:50, where the player play at speed ×2 for 150 msec.

Based on the calculated sync player position, the player can reach the calculated sync player position, by applying the selected at least one sync algorithm (block 740 corresponding block 550 in FIG. 5). Although applying the synchronization process has been described as if it occurs only if the player position is determined to be not nearly synchronized with the reference position, a person versed in the art would realize that applying the synchronization process can occur at all times after obtaining the reference position and player position. In examples where the player position is determined to be nearly synchronized with the reference position, then applying the synchronization process and reaching the calculated sync player position can include continue play at regular speed.

Figure 8:
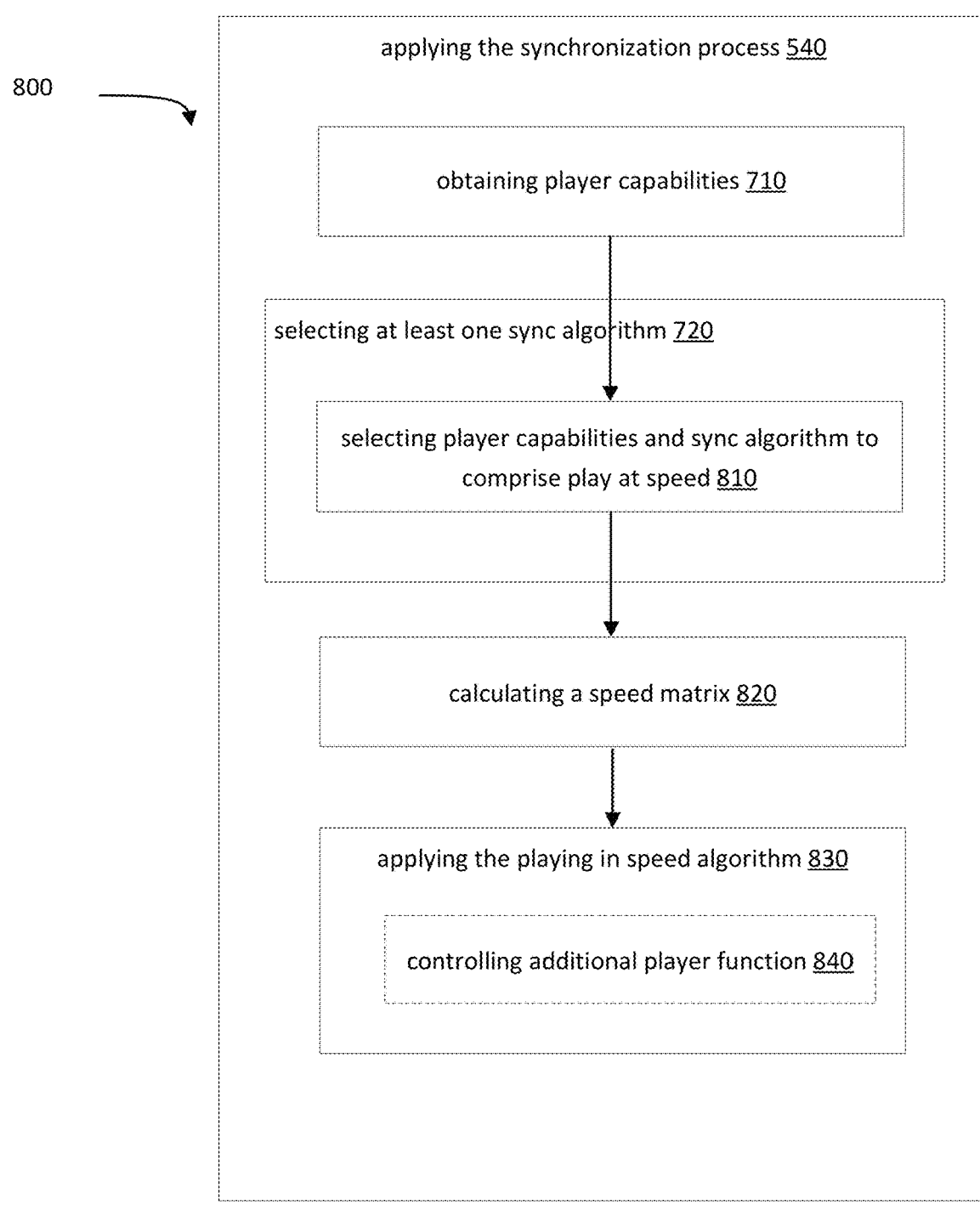
FIG. 8 illustrates a flow chart of operations comprised in applying a play at speed algorithm, in accordance with certain embodiments of the presently disclosed subject matter.

The first sync algorithm is 'play at speed'. Reference is made to FIG. 8 illustrating operations comprised in applying the play at speed algorithm, in accordance with certain embodiments of the presently disclosed subject matter. The operations can be performed when applying the synchronization process (block 540 in FIG. 5) when 'play at speed' is selected.

In some examples, if the obtain player capabilities (block 710) comprises 'play at speed', synchronization orchestrator module 620 can select the 'play at speed' sync algorithm to be applied (block 810). This stage corresponds to block 720 of FIG. 7. In some examples, 'play at speed' includes the player 360 playing the content at a certain speed: high speed at different degrees, slow speed, or regular speed, in order to reach the sync player position. In order to apply a 'play at speed' sync algorithm, a speed matrix can be calculated (block 820). With reference to FIG. 6, synchronization orchestrator module 620 can communicate with speed calculator module 630. Speed calculator module 630 is configured to calculate the speed matrix that will most optimally take the player 630 to a player position within the allowed pre-configured threshold from the reference position. In some examples, the speed matrix comprises a degree of speed to apply to reach the calculated sync player position. In the above example of the pre-configured threshold of [−50,50] msec, where the normalized reference position is 300 msec and the player position is 150 msec, speed calculator module 630 can calculate the following speed matrix:

play in speed ×2 for 150 msec.

After 150 msec, the room position will be 450 msec and the player position will be 450 msec.

In some examples, the speed matrix comprises more than one degree of speed to apply. For example, if the distance is 1.5 seconds behind reference position, calculator module 630 can calculate the following speed matrix:

run 1250 msec in 1.8 speed; then
run 900 msec in 1.5 speed; then
run 500 msec in 1.1 speed In some examples, the speed calculator module 630 can calculate the speed matrix that will most optimally take the player to a position within the allowed threshold from the room position. When calculating, the speed calculator module 630 may base the calculation on one or more parameters to achieve the optimal matrix in terms of:

User experience
Time of running in speed mode
Player learned behavior (e.g., how immediate/fast the player 630 actually changes its speed)

While basing the calculation on the above parameters, and based on the reference position and the player position, the speed calculator module 630 may dynamically determine the matrix that best achieves a balance between the above parameters. For example, bad user experience can be reflected in ping pong forward and rewind, if missing the allowed threshold, or too long time in forward mode. To achieve a balance between the parameters, speed calculator module 630 may apply one or more rules on the speed such as 'sync time may be capped by 5 sec, with minimal time in high speed'.

In some examples, speed calculator module 630 calculates the speed matrix that reflects the best balance between time to sync (TTS) and user experience in terms of viewing experience. In some examples, speed calculator module 630 may keep TTS less than 1 second and low speeds playing, as much as possible. Since speed calculator module 630 may calculate the speed matrix player learned behavior, then a different speed matrix may be calculated for different types of players.

Following is a description of exemplary algorithms for calculating the speed matrix. In some examples, a second threshold can be defined. In the defined second threshold, play at speed is allowed. For example, if the allowed sync threshold (the initial allowed first threshold) is [−50,50], the second threshold can be [−1500,1500], such that inside the range of the first threshold the player is synced. Out of the second threshold too far, seek based algorithm (another sync algorithm described further below) can be selected, whereas inside the second threshold, play at speed sync algorithm is applied. For each interval, a matrix that defines the speed is determined. For example: <100 run in 1.1, 100<=x<500 1.5 500<x 1.8. Yet, in some examples, configuration and device specific parameters such as speed accuracy of the player, and allowed time to get to sync position, can be added to the fixed intervals when calculating the speed matrix. Yet, further in some examples, the interval configuration can be used as a starting point. Then, a learning process can be implemented while making adjustments to the configuration (AI), until maximizing results to criteria is achieved. The matrix calculation can also take into account the range size of the sync threshold, so if the allowed threshold is [−50,50], the algorithm would look for reaching the threshold at a very low speed, as to avoid overshooting and going out of the boundary on the other side. If, for example, the allowed threshold is [−500,500], then the algorithm has more room for mistakes, so it can use higher speed.

Once the speed matrix is calculated, synchronization orchestrator module 620 can reach the calculated sync player position (block 740 in FIG. 4) by applying the 'play at speed' algorithm (block 830). In some examples, when applying the 'playing at speed' algorithm, the speed calculator module 630, or its executer, can further control at least one additional player function (block 840) e.g., to facilitate an improved user experience by an improved play of the content during the reaching process. For example, calculator module 630 can control the volume of the player, to achieve a better user experience when running at speed, or can provide a notification to the application that a sync algorithm is applied, such that the application can determine to display a 'syncing' slide until reaching the calculated sync player position, and revert to displaying the video only when reaching the calculated sync player position.

In some cases where the obtained player capabilities include 'play at speed', before selecting and applying the 'play at speed' algorithm, synchronization orchestrator module 620 can determine that the distance between the reference position and the player position meet a certain condition, such that the 'play at speed' algorithm would be the optimal algorithm to reach synchronization. As described above, synchronization orchestrator module 620 can determine that the distance is within a second threshold, e.g. [400,100] msec, which is larger than the initial pre-configured threshold of e.g. [−50,50] msec for determining that the player position is not nearly synchronized with the reference position. Yet, based on the distance being within the second threshold, synchronization orchestrator module 620 can determine that the optimal algorithm to reach synchronization is to apply the play at speed algorithm. Based on that determination, synchronization orchestrator module 620 can select the play at speed algorithm in such cases. Therefore, synchronization orchestrator module 620 can determine that the distance exceeds a first threshold being the pre-configured threshold for determining that the player position is not nearly synchronized with the reference position, but does not exceed a pre-configured second threshold, where the second threshold is larger than the first threshold, and to select the 'play at speed' algorithm to reach the sync player position.

In some cases, as explained above, even after calculating a sync player position and applying a synchronization process, the player 360 is out-of-sync with the room 110, for example, since the sync algorithm did not work as expected and the player 360 did not reach the calculated sync layer position, or if the player 360 did reach the calculated sync layer position, yet the reference position made further progress, and the current player position is not nearly synchronized with the reference position. Such an attempt to reach synchronization, and failure to reach the synchronization, can be used to learn the player performance in that particular synchronization process, i.e. with respect to the current content and room, or, on a more general level, with respect to the player performance when applying a certain sync algorithm.

Hence, in some cases, when synchronization orchestrator module 620 selects a synchronization process to be applied, synchronization orchestrator module 620 may base the selection on history of previous attempts of the player 360 to sync. Considering the history of previous attempts may be advantageous in order reach the calculated sync player position in an optimal manner. For example, if a sync algorithm was selected and applied several times, yet the player 360 did not succeed in reaching the calculated sync player position, then this sync algorithm should not be selected at this stage.

In some examples, an attempt can include previous attempts of player 360 to reach a previously calculated sync player position. The previous attempts to reach the calculated sync player position were made using one or more sync algorithms that were selected. The previous attempts were made in the current synchronization process session, while trying to reach a calculated sync player position in the current room 110, or in previous synchronization processes sessions, unrelated to the current room 110, and are indicative of general performance and success of sync algorithms.

Each attempt resulted in an outcome, either success or failure to reach the sync player position. In some examples, optionally after the player did not manage to sync to the room 110, synchronization orchestrator module 620 may determine to apply a synchronization process to result in a calculated sync player position which does not meet the pre-configured threshold, yet meets another, second, pre-configured, threshold which reflects a farther distance from the reference position than the first threshold, yet is closer than the current player position, and constitutes some progress in the synchronization process. In such examples, the failure of reaching the sync player position can occur if a certain selected sync algorithm also resulted in not reaching the second pre-configured threshold.

The attempts and respective results can be stored in memory 312, in user device 150, in history of attempts 317. In some examples, history of attempts 317 can constantly be updated, e.g. each time a sync algorithm is applied, by sending feedback on the selected and applied sync algorithm to history of attempts 317, or at the end of a session of attempts, comprising feedback on the overall result of the sync algorithms that were selected in the session.

In order to make a selection of the sync algorithm, synchronization orchestrator module 620 may obtain the history of attempts and respective attempts results, and select the sync algorithm based at least on the obtained history. For example, synchronization orchestrator module 620 may determine, based on the history of attempts that pertain attempts made in the current synchronization process, that a certain sync algorithm does not succeed in reaching the first or second thresholds, and after one or several attempts to use the specific sync algorithm, it should not be selected at this stage. In such examples, synchronization orchestrator module 620 may select a sync algorithm that is different to each of sync algorithms used in the history of attempts. Alternatively, or additionally, synchronization orchestrator module 620 may determine, based on the general history of the synchronization process, that a certain sync algorithm does not succeed in similar cases of trying to synchronize, e.g. since the player 360 does not act as expected in such sync algorithms, resulting in failures. Hence, synchronization orchestrator module 620 may skip the specific sync algorithm when selecting a sync algorithm from available sync algorithms.

Below is a description of sync algorithms including 'seek' functionality of the player 360, such as 'seek to position' and 'seek and pause'. The 'seek to position' sync algorithm includes seeking a sync player position, such that the player position, when reaching the sync player position, is nearly synchronized with the reference position, and reaching that player position. The 'seek and pause' sync algorithm includes the seeking to a sync player position, which exceeds the reference position, reaching that position, and pausing from playing the content. Pause proceeds until the reference position reaches that sync player position. 'Seek and pause' may be used in cases where the player cannot reach a sync player position e.g., since the content is live, the buffering limit of the player 360 is low, and the calculated sync player position is too close to live streaming, such that the player 360 cannot play the content at any close sync player position. In such cases, the player can jump to a later position in the content, and wait for the reference position to reach the player position. Also, 'seek and pause' can be used in cases where the player position is not within the second, larger, threshold, the player capability of frame accurate seek is not enabled, or, in other cases, after multiple failures of seek to position.

In some cases, in order to calculate the sync player position after a 'seek to position' algorithm is selected, media synchronizer module 344 calculates the required sync player position involving seeking to a position, e.g., the player position that player should seek to in order to synchronize with the reference position. In some examples, the calculated sync player position includes a prediction of the time that will be required by the player 360 to reach a calculated sync player position when seeking is executed. For example, assume the normalized reference position at 8:00:00 is 1000 and the player position is 3000. The player 360 needs to seek to position 1000 now at 8:00:00, however, according to the buffering time estimation, to seek to position 1000, it will take the player 500 msec until start to play, so if 'seek' is activated, when start to play from position 1000, the normalized position at time 8:00:0 will be already 1500. In such a case, the sync player position should be 1500.

Predicting the time to seek may be crucial for success of the player 360 to reach synchronization with the room 110. In some examples, the latency caused by the time required for the player 360 to perform the action of seeking and reaching the sync player position makes the sync player position no longer relevant, since the reference position already progressed in a manner which rendered the positions being no longer synchronized.

Figure 9:
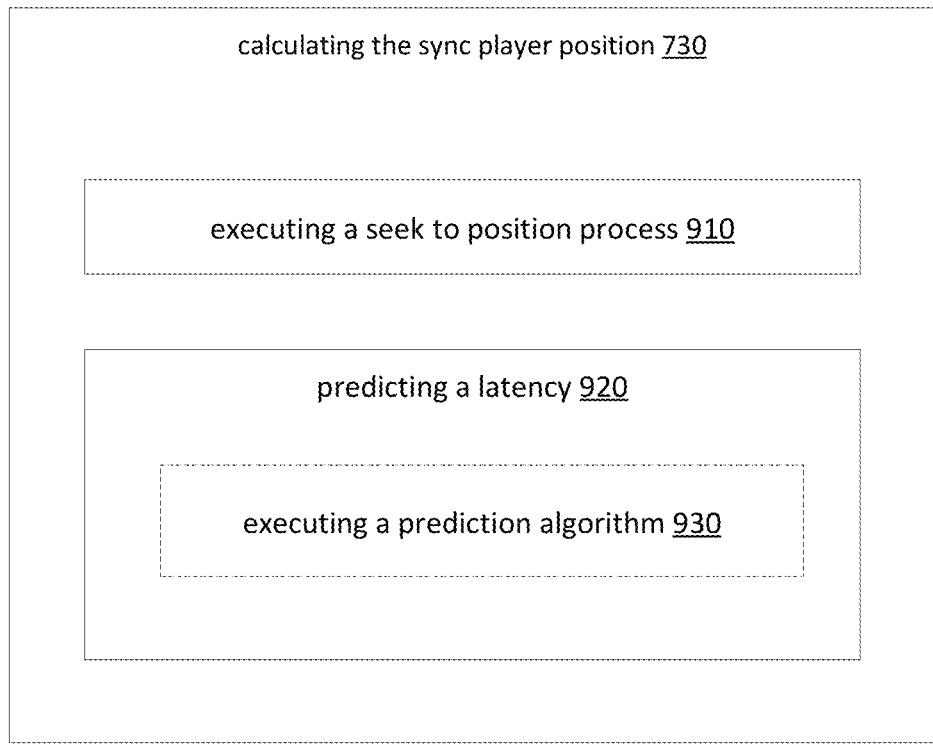
FIG. 9 illustrates a flow chart of operations comprised in predicting the latency, in accordance with certain embodiments of the presently disclosed subject matter.
Figure 10:
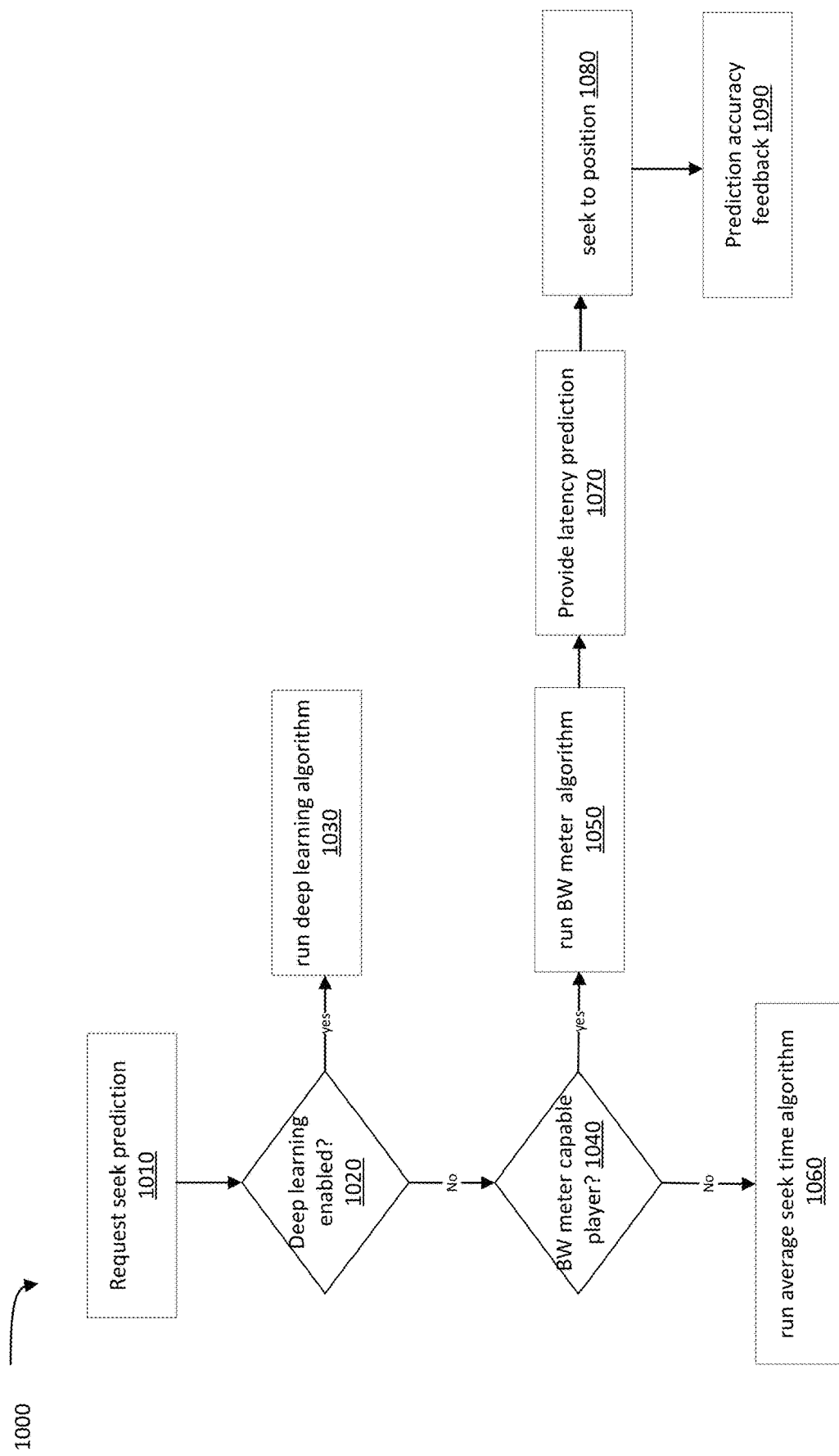
FIG. 10 illustrates an exemplary flow of executing prediction algorithms, according to certain embodiments of the presently disclosed subject matter.

Reference is made to FIG. 9 illustrating operations comprised in calculating the sync player position (block 730 in FIG. 7), in accordance with certain embodiments of the presently disclosed subject matter. Reference is also made to FIG. 6 with respect to media synchronizer module 344 components.

In some cases, synchronization orchestrator module 620 may request seek position calculator module 640 to execute a 'seek to position' process to calculate a player position that player should seek (block 910). The seek position calculator module 640 may calculate the position to seek to based on one or more of the following parameters:

Capabilities of player 360 (such as frame accurate seek)
Player position, distance between player and normalized reference positions
Player buffer time
For example, if it is determined that the player buffer is 3 seconds, the player position is 1000 and reference position is 2000, it can be determined that the frames to seek are already in the device player buffer, so it is not required to pull from the network the frames to seek, resulting in a faster seek Previous attempts result, e.g., as obtained from history of attempts 317

Seek position calculator module 640 may apply one or more rules to calculate position to seek. Following are some non-limiting examples of execution of the seek position calculator module 640:

If the player has already made several previous attempts, e.g. 5 attempts, in the current session, to reach a sync player position, and failed to reach a sync player position that is nearly synchronized with the reference position, seek position calculator module 640 may apply a 'seek and pause' algorithm by calculating a sync player position including a position that is ahead of the reference position, and pausing until the reference position catches up.

If capabilities of player 360 comprise 'speed play' but not 'frame accurate seek', and the current player position is 100 msec from a segment start position, seek position calculator module 640 may seek a segment start position, and then execute a 'play at speed' sync algorithm for reaching the room position.

In some cases, synchronization orchestrator module 620 may further predict a latency caused by a seek time required to complete reaching the calculated sync position (block 920). For example, synchronization orchestrator module 620 may request seek predictor 650 to calculate a prediction of the maximum latency that will be required for seeking a given position. Based on the predicted latency, synchronization orchestrator module 620 calculates the sync player position.

In some examples, seek predictor 650 is configured to execute one or more prediction algorithms to estimate seek-to-play time to provide a prediction (block 930). The prediction algorithms are selected from a group consisting of: bandwidth meter algorithm, average seek algorithm, and deep learning algorithm. Selecting a prediction algorithm can be based on one or more parameters, including at least player capabilities, computation complexity constraints, history of attempts, or a combination thereof.

Following is a description of the prediction algorithms:

Bandwidth Meter Algorithm

This prediction algorithm can be used, e.g., if the player capabilities include, inter alia:

Player reliable required buffered time to start play.

The player should expose:
1. Play buffering time—the time needed to be buffered, that, when reached the player, the player can start playing the first frame in the buffer
2. Current ABR bitrate playing
3. BW estimation Bandwidth meter exposed by the player 360 to estimate the bandwidth at the current moment Access to the metadata about current played bitrate, e.g., as obtained from player metrics module 336;

Bandwidth meter algorithm may input the above capabilities into a formula to anticipate buffering time latency:

Latency=<time to buffer>*<current bitrate><current bandwidth>

Average Seek Time Algorithm

This prediction algorithm may require obtaining player state events, e.g., by obtaining them from the player interface 330 using player events module 338. The player state events can be "READY" or "BUFFERING". The prediction algorithm may calculate moving average of previous seek attempts in history, on a configured window, excluding seeks that resulted in greater than a defined threshold deviation in the result distance from the requested position. For example, in the last 5 minutes, player had 3 seeks which took 400, 500, and 600 msecs respectively. For the same bitrate, seek time will be estimated to be the average—500 msec.

Deep-Learning Algorithm

The deep learning prediction algorithm may have more accuracy prediction, however it may require higher consumption of device resources. This algorithm aims to provide an outcome of accurate latency prediction based on ever-growing training data history, e.g., such that it is created from previous seek attempts. The deep learning algorithm may use the training data to build its ever-improving prediction for seek time for a specific user device. The process will start with one of the above algorithms to build the data set, and, at some point in time when the training data is sufficiently large, it may start using the deep learning prediction. The used training data may include, among others: seek distance from current position (in or out of existing buffer), device condition (CPU load, memory load), network condition (network condition, current available bandwidth), other SDK bandwidth consuming features, time of day, played bitrate, content type, and seek success (how far from the spot the player hits).

In some examples, seek predictor 650 may select a prediction algorithm based on the SDK 320 configuration and player 360 capabilities. Yet, in some examples, seek predictor 650 may select a prediction algorithm while balancing between accuracy and complexity. For example, if the user device 150 cannot run ML, then the prediction algorithm will have less accurate prediction, but less complexity. Yet, since the prediction algorithm and the number of sync actions taken during the synchronization proceed are, in overall, not frequent in the operation of the user device 150, the required computational complexity can have less effect on the decision whether to select the deep learning prediction algorithm or not. Still further, seek predictor 650 may execute the prediction algorithms according to the exemplary prioritization flow illustrated in FIG. 10 according to certain embodiments of the presently disclosed subject matter:

1. The Media Synchronizer module 344, using synchronization orchestrator module 620, may request a latency prediction for a seek position from the seek predictor 650 (block 1010);
2. If Deep-Learning prediction algorithm is enabled (block 1020):
    Execute Deep Learning algorithm (block 1030);
3. Else, if player capabilities expose the set of capabilities required for BW
    Meter prediction algorithm (block 1040):
        Execute Bandwidth (BW) Meter algorithm (block 1050);
    Else:
        Execute average seek time algorithm (block 1060);
4. Seek latency prediction may be returned to synchronization orchestrator module 620 (block 1070);
5. After the seek has been executed (block 1080) the synchronization orchestrator module 620 may send prediction accuracy feedback to the seek predictor 650 that is fed back into the executed algorithm for learning or for history tracking (block 1090).

Another option of execution can include moving from the BW meter algorithm to the average seek time algorithm, in case, after multiple attempts, it is identified that the BW meter does not provide good results.

In some cases, despite several attempts to sync to the reference position, e.g., by reaching several sync player positions and determining that the player position is not nearly synchronized with the reference position, the media synchronizer module 344 may determine that the player 360 cannot reach any calculated sync player position, and hence cannot sync to the reference position. There may be several reasons for not being able to sync to the reference position. For example, if the reference position in the content is too close to the live broadcast, and the player 360 cannot comply with the bandwidth requirements. Assume, for illustration, that the reference server 140 set the reference position to 3 seconds behind live, and player's 360 limitation is to buffer 5 seconds before play. In such an example, player 360 can never reach synchronization with the reference position, irrespective of which sync algorithm is to be selected. Another example can be based on the player capabilities and history of attempts, where after obtaining the history and considering current player capabilities, it is determined that the player cannot sync.

Reference is made to FIG. 11 illustrating a generalized flow chart of further operations performed in user device 150 in accordance with certain embodiments of the presently disclosed subject matter. Once determining that the player position is not nearly synchronized with the reference position (block 530 in FIG. 5), the synchronization process can be applied. Based on one or more reasons exemplified above, media synchronizer module 344 may determine, during the synchronization process, that the player 360 cannot reach any calculated sync player position (block 1110).

Based on the reason that the player cannot reach synchronization, media synchronizer module 344 may transmit a failure notification, e.g., to reference server 140 (block 1120). Transmitting to the reference server a failure notification may be advantageous if the reference server wishes to update the reference position, such that user devices 1410 which wish to join the shared room 110 can reach synchronization. Transmitting the failure notification may be dependent on the reason for not being able to synchronize. For example, if the reason for not being able to sync results from the reference server 140 setting a reference position which cannot be reached by the player 340, then the media synchronizer module 344 may transmit a failure notification. On the other hand, if the player 360 cannot reach synchronization since the accuracy of the prediction algorithm executed by the user device 150 is low, then there is no point in notifying the reference server 140, and media synchronizer module 344 may avoid notifying the reference server 140 of its failures.

In response to receiving the failure notification, the reference server 140 may dynamically update the reference position and may send the updated reference position to the user device 150 that is in the room 110 (block 1130). The user device 150 can then apply the synchronization process 1140 with respect to the updated reference position (block 1140).

Referring back to FIG. 5, in some cases, the user device 150, e.g., using synchronization watchdog module 610, can continuously monitor the synchronization of the player position to that of the reference position during the watch party when the content is played. If the synchronization watchdog module 610 determines that the user's device is out-of-sync by determining that the player position is not nearly synchronized with the reference position, the synchronization orchestrator module 620 may apply the synchronization process to achieve synchronization. Following are non-limiting examples of reasons that the player position is out-of-sync with the reference position: the user device 150 has just joined a room 110; the user device 150 is in the room 110 and a room participant changed the reference position or play state of the content in the room 110 (controlling the reference position by a device is further described below); the user device 150 was synchronized with the room 100 and lost synchronization (for example after a re-buffering event of the user device 150); the reference server 150 identified timeline change in the content and updated the reference position for all user devices 140 in the room 110; the user device 150 notified the reference server that it cannot sync to the reference position and the reference server 140 updated the reference position to accommodate it.

In some examples, the synchronization process can be applied, repeatedly, until the player position is synchronized with the reference position (this is shown by the dashed line in FIG. 5 from block 550 to block 510). In order to repeatedly apply the synchronization process, synchronization orchestrator module 620 may obtain a current reference position in the content, e.g. receiving a current reference position from the reference server 150 and calculating a normalized reference position, or calculating the normalized reference position based on the initially received reference position and the current time. Based at least on the normalized reference position, the synchronization process can be applied to reach a calculated updated sync player position, such that the player position, when reaching the updated sync player position, is nearly synchronized with the reference position.

Figure 12:
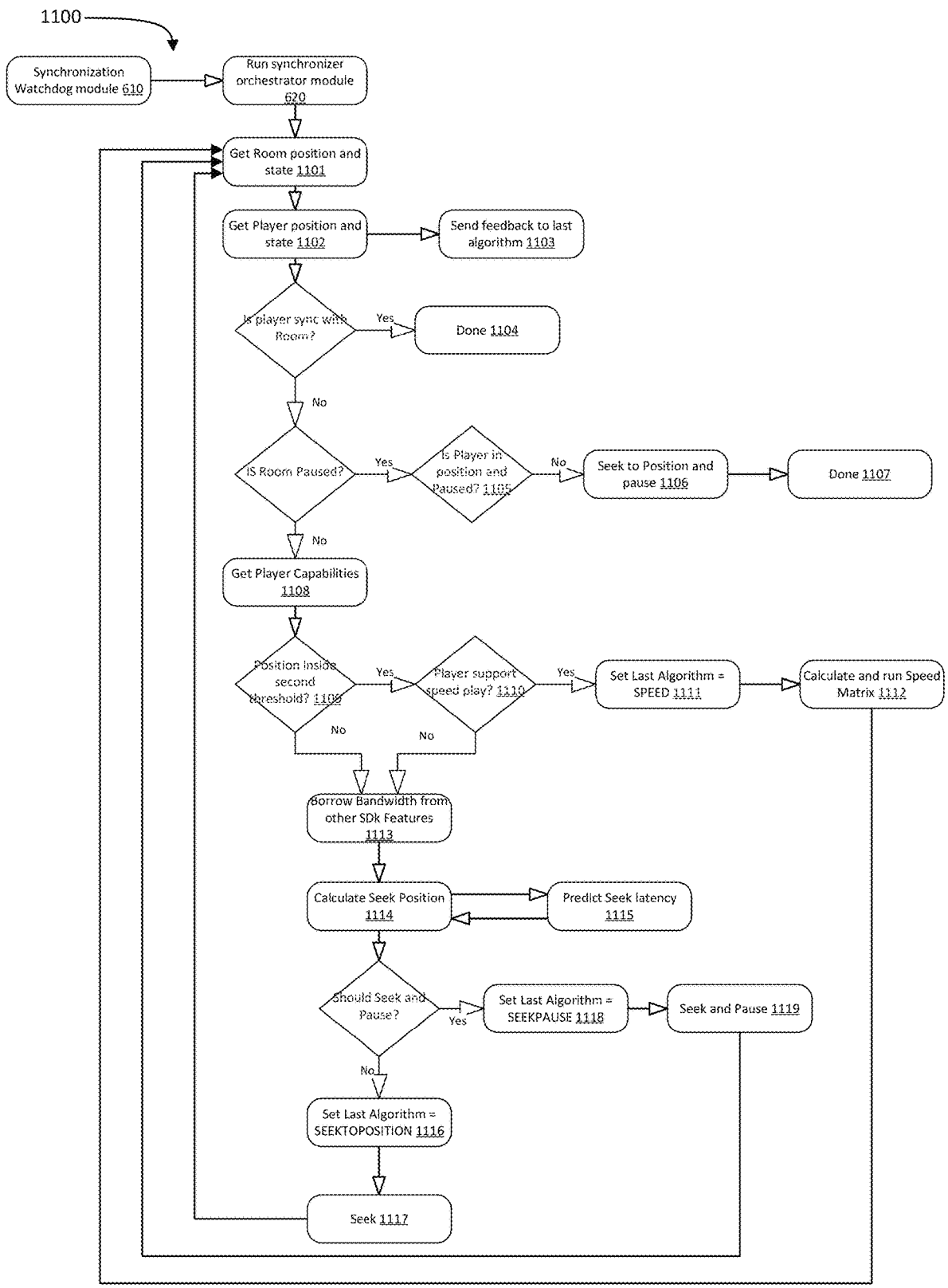
FIG. 12 illustrates an example of flow of operations in accordance with certain embodiments of the presently disclosed subject matter.

Reference is made to FIG. 12 illustrating an example of flow of operations in accordance with certain embodiments of the presently disclosed subject matter:

As illustrated, the flow initiated by the synchronization watchdog module 610 is periodically executed and runs the synchronizer orchestrator module 620 to execute the following stages:

1. Obtain reference position, e.g., from the room module 352 (1101). In some examples, content state can also be obtained;
2. Obtain player position, e.g., from the player interface 330 (1102). In some examples, player state (play/pause) can also be obtained;
3. Send feedback to last algorithm executed on execution result accuracy (1103) (for the algorithms to apply tuning, if needed)
4. If the player position is in sync with the reference position, processing is done (1104)
5. If the room was paused (such as when an update is received from the reference server of a change in the content state from play to pause), then change player state from play to pause (1105), or seek to position (1106) and pause in position if needed (1107)
6. Get the player capabilities (1108)
7. If the player is within the predefined threshold (e.g., second threshold) (1109), player position can be tuned using e.g., speed play. In such cases, player capabilities are determined to make sure 'play at speed' capability is available in the player (1110), update e.g. in history of attempts 317, that 'last algorithm used was speed' (1111) then calculate speed matrix (1112) and loop back to start (arrow to 1101).
8. If not:
   1. Calculate seek position (1114) and calculate and add the estimated seek latency (1115)
   2. Based on the output of the position calculator, it can be determined whether to apply seek to accurate position ('seek to position', 1116), or seek ahead of room time and pause ('seek and pause', 1118)
3. Execute seek (1117) or seek and pause (1119) and state change (if needed) and loop back to start (arrows to 1101)

Reference is now made to a description of the reference server 140 managing and operating a room 110 to which one or more devices can join. In some cases, the reference server 140 may facilitate a synchronized play of a content by a plurality of user devices 140 joining a virtual shared watch room. The reference server can determine the reference position, and each user device 150 that wishes to join the room may perform the operations described above with reference to FIG. 5, until reaching synchronization with the room.

Figure 13:
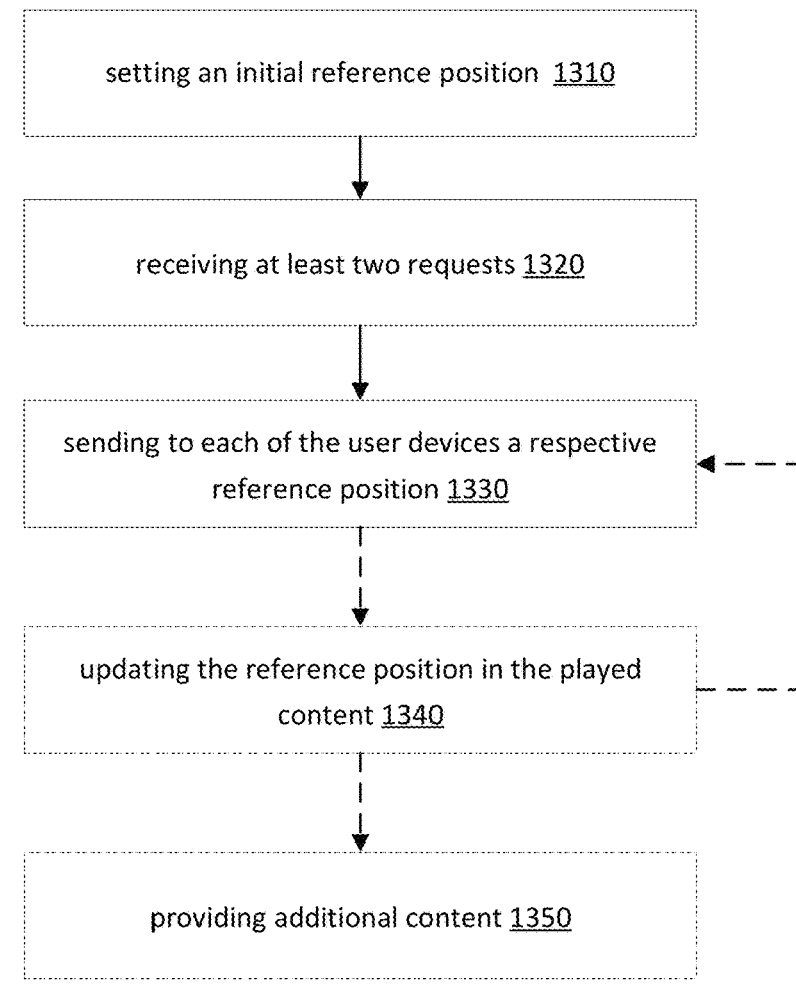
FIG. 13 illustrates a generalized flow chart of operations performed in reference server 140 in accordance with certain embodiments of the presently disclosed subject matter.

Reference is made to FIG. 13 illustrating a generalized flow chart of operations performed in reference server 140 in accordance with certain embodiments of the presently disclosed subject matter.

As explained above, in some cases, reference server 140 may establish a shared watch room to facilitate a synchronized play of content by players in user devices 150 that wish to join the room. In order to facilitate the synchronized play, the reference server 140, e.g., using position manager module 254, illustrated in FIG. 2, may set an initial reference position in the content in the virtual shared watch room that it established (block 1310). Position manager module 254 may receive requests from a plurality of user devices 150 to join the virtual shared watch room (block 1320). In some examples, the position manager module 254 may receive one request from a user device 150. Yet, in some examples, the position manager module 254 may receive at least two requests from at least two user devices 150. In order to facilitate the synchronized play of content by players in user devices 150, position manager module 254, e.g., using channel interface 252, may send to each user device 150 a respective reference position (block 1330). The reference position sent to each of the user devices 150 is based at least on the initial reference position. It should be noted that the respective reference position sent to each user device 150 should be interpreted as identical in terms of the indication of the reference position in the content 120, yet, the reference position may be sent from the reference server 140 and received by the user device 150 at different times. In some examples where more than one manifest type is involved, the reference position can have different values in the position field (but not in the time field). In such cases, the reference server 140 can calculate the room position for one or more manifest types (such as HLS or DASH), and determine the time of the reference position to be 8:00:00 for both, where the position for HLS is 1000 and for DASH can be 2000. The reference server 140 can calculate a list of positions for all content URLs and send the map of URL to positions to the user devices joining the shared content channel. Each user device 150 receiving the map can select, based on the URL that the user device 150 plays, the corresponding position, and sync the player to that position.

Once the user device 150 has received the reference position, the user device 150 can apply the synchronization process, as detailed above, to reach a respective player position, such that each player position is nearly synchronized with the reference position.

In some examples, the virtual shared watch room 110 established by the reference server 140 is a dynamic shared watch room, such that devices can join and leave the room at different times. Each of the user devices 150 can join at a different time, receive the reference position, and sync to the room, and leave the room at a later stage. As such, the requests from different user devices 150 are received at different times.

The position manager module 254 can set the initial reference position when first establishing the room 110. Additionally, the position manager module 254 can set the initial or an updated reference position, randomly or based on one or more parameters. For example, setting the initial reference position can be based at least on a manifest type of the played content, e.g., live/VOD. For example, if the manifest is VOD, the manifest can start from position 0 and is a closed manifest, such that all segments of the content are in possession of the reference server 140, and any network delays in routing segments between the service provider and the reference server/the user devices of the content are irrelevant. In such cases, the position manager module 254 can determine to set the position to 0. If, however, the manifest is live, then it is an open manifest, such that segments of the content keep being added and removed at the reference server 140, while following absolute epoch time to identify segment position. This may affect the reference server 140 when setting a reference position. For example, in 'live' the reference server 140 may set reference position as close as possible to the live content, yet the reference position should be such that it can be reached by most of the user devices 140 that have joined the room 110. Another example of a parameter may be the protocol, or the number of URLs available for the shared content used by the players of the user device 150 to play the content, such that setting the initial reference position is based at least on at least one the protocols. Different URLs used by the user device 150, such as dash or HLS, may influence the initial reference position. Yet another example of a parameter may be the platform used by the user device 150, such as Android, IOS, or the type of player used by the user device 150, such that setting the initial reference position is based on the platform/type of player used by the user device 150.

To illustrate, for VOD content the reference server 140 can set both initial position and initial state. In some examples, by default, the reference server 140 set the initial position to 0 and initial state to PLAY, however any creator of room 110 can request to set a different initial position and state on creation, that will override the default configuration. For live content, the reference server 140 can calculate a segment table of the live manifest (or manifests, if more than one), with absolute time for each segment, and calculate the timeline difference between the URLs. Then, the position manager module 254 can select a position based on configured time from the manifest end (optionally, 15 seconds). When user devices 150 join the room 110, the user devices 150 can report some requirements (such as minimal buffer time) and the reference server 140, based on policy, can determine whether the current position does not fit the requirements, and to update the room position accordingly, as explained below.

In some cases, the position manager module 254 can update the reference position (block 1340), e.g., once room policy module 256 determines that a specific event should trigger re-calculating the reference position to accommodate the event. For example, if user device 150 is not able to sync to reference position because it is too close to live content, the position manager module 254 may determine whether to put the reference position further back from live, or have this user device 150 remain out-of-sync. Position manager module 254 may update the reference position in response to room policy module 256 receiving one or more of the following events, and determine that an update of the reference position is required: manifest change, type of players of user devices, receiving a failure notification from a user device 150, or receiving a request from a user device 150 to update the reference position. For example, detecting a change to the ABR manifest might impact the shared content synchronization. For example, this may occur in cases where the content has more than one URL, and timeline discontinuity, detected in one or more of the servers, will re-calculate the position. Receiving, e.g., from user devices 150, an indication of the capabilities of their players, may also result in updating the reference position, as different players have different capabilities and different ability to reach sync with the room. If a new user device 150 joined the room 110, and the type of player of the new user device cannot meet reference position that is 2 sec behind live, since it has a buffering limit that requires 5 sec, then room policy module 256 may determine to update the reference position, or may determine that this new device remains out-of-sync. Also, receiving a failure indication from user device 150 indicative that the player position in the user device 150 is not nearly synchronized with the reference position, may result in updating the reference position. Yet, in some examples, a user wishes to control the content being played in the room, and may send a request for the reference server 140 to update the room position. In such examples, room policy module 256 can determine whether to grant the request or not. For example, room policy module 256 may refuse the request, e.g., if the content is live, and the request is to update the position to be further back from live. Room policy module 256 may also refuse the request if it determines, based on the players of the user devices that are in the room, that some user devices 150 cannot sync to the requested reference position. If the request is granted by the room policy module 256, then room policy module 256 can update the reference position and send the updated reference position to the user devices to sync.

Each of the reasons may trigger an update of the reference position, with the aim that the room policy module 256 aims to set a reference position that all, or most of the user devices 150 that joined the room 110, can be synced to.

In some examples, updating the reference position can be done in a repetitive manner by position manager module 254. Once the reference position is updated, the updated reference position is sent to the user devices 140 that joined the room (block 1330 can be executed once again).

It is noted that the teachings of the presently disclosed subject matter are not bound by the flow charts illustrated in FIGS. 5, 7-13, and that the illustrated operations can occur out of the illustrated order. For example, operations 510, 511, 512 and 520, stages in flow 12 pertaining to different sync algorithms, or 1310 and 1320 shown in succession, can be executed substantially concurrently, or in the reverse order.

It is noted that the teachings of the presently disclosed subject matter are not bound by the computerized content sharing environment 100 described with reference to FIG. 1, by the reference server 140 described with reference to FIG. 2, or by the user device 150 described with reference to FIG. 3. Equivalent and/or modified functionality can be consolidated or divided in another manner, and can be implemented in any appropriate combination of software with firmware and/or hardware and executed on a suitable device. The reference server 140 can be a standalone network entity, or integrated, fully or partly, with other network entities. Those skilled in the art will also readily appreciate that the data repositories such as memory 230 or memory 312 can be consolidated or divided in other manner; databases can be shared with other systems or be provided by other systems, including third party equipment.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems, for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. In a user's device, a computerized method for facilitating a synchronized play of a content by a user device's player, the method comprising:
  receiving a reference position in the content;
  retrieving a player position in the content; and
  based on the received reference position and the retrieved player position:
    determining if the player position is nearly synchronized with the reference position; and
    if the player position is not nearly synchronized with the reference position, applying a synchronization process to reach a calculated sync player position, such that the player position, when reaching the calculated sync player position, is nearly synchronized with the reference position.

2. The computerized method of claim 1, wherein receiving the reference position further comprises calculating a normalized reference position based on the received reference position, and
  determining whether the player position is nearly synchronized, based on the calculated normalized reference position.

3. The computerized method of claim 1, wherein receiving the reference position comprises receiving a content playing state; and
  applying the synchronization process based at least on the received content playing state.

4. The computerized method of claim 1, wherein determining if the player position is nearly synchronized further comprises:
  calculating a distance between the reference position and the player position; and
  determining that the player position is nearly synchronized when the distance does not exceed a pre-configured threshold.

5. The computerized method of claim 4, wherein applying the synchronization process to reach a calculated sync player position further comprises:
  obtaining capabilities of the user device's player;

selecting, based on the obtained user device's player capabilities, at least one sync algorithm; and calculating, based on the selected at least one sync algorithm, a sync player position to be reached by the user device's player in order to become nearly synchronized with the reference position; and reaching the calculated sync player position, by applying the selected at least one sync algorithm.

6. The computerized method of claim 5, wherein said obtained player capabilities comprise one or more capabilities selected from a group consisting of: play at speed, frame accurate seek, controlled buffer size and bandwidth meter, control of average bitrate (ABR) profiles and control of player buffering sizes or a combination thereof, and wherein the at least one sync algorithm is selected from a group comprising: play at speed, seek and pause, seek to position, or a combination thereof.

7. The computerized method of claim 5, wherein said obtained player capabilities comprise play at speed capability, and wherein said selected at least one sync algorithm comprises play at speed algorithm, the method further comprising:

calculating a speed matrix comprising at least one degree of speed to apply to reach a position constituting the sync player position in order to become nearly synchronized with the reference position; and reaching the sync player position by applying the play at speed algorithm.

8. The computerized method of claim 7, wherein calculating the speed matrix is based at least on one or more of: smooth video playing, time of running in speed mode, and player learned behavior.

9. The computerized method of claim 7, the method further comprising:

determining that the player position is not nearly synchronized with the reference position, such that the distance between the reference position and the player position does exceed the pre-configured threshold, constituting a first threshold, but the distance does not exceed a pre-configured second threshold, the pre-configured second threshold being larger than the first threshold; and applying the synchronization process by selecting play at speed, to reach the sync player position.

10. The computerized method of claim 7, wherein applying the play at speed algorithm comprises controlling at least one additional player function to facilitate an improved play of the content during said reaching the sync player position.

11. The computerized method of claim 10, wherein controlling the at least one additional player function comprises controlling a volume of the player.

12. The computerized method of claim 5, wherein said obtained player capabilities comprise frame accurate seek capability, and wherein said selected at least one sync algorithm comprises seek and pause algorithm, the method further comprising:

in order to become nearly synchronized with the reference position, calculating a sync player position that exceeds the reference position;

seeking to the calculated sync player position, and pausing from playing the content.

13. The computerized method of claim 5, wherein an attempt is defined to include reaching of the player to a previously calculated sync player position using selected at least one sync algorithm, and a result of each attempt is defined to include either success or failure to reach the sync player position, and wherein said selecting the at least one sync algorithm further comprises:

obtaining a history of attempts and respective attempts results;

selecting the at least one sync algorithm based at least on the obtained history.

14. The computerized method of claim 13, wherein selecting the at least one sync algorithm further comprises selecting at least one sync algorithm that is different to each of sync algorithms used in the history of attempts.

15. The computerized method of claim 5, wherein said obtained player capabilities comprise frame accurate seek capability, and wherein calculating the sync player position further comprises:

executing a seek to position process to calculate the sync player position;

predicting a latency caused by a seek time required to complete reaching the calculated sync position; and calculating the sync player position based at least on the predicted latency.

16. The computerized method of claim 15, wherein predicting the latency further comprises:

executing at least one prediction algorithm; and predicting the latency based on the executed at least one prediction algorithm.

17. The computerized method of claim 16, wherein the at least one prediction algorithm is selected from a group comprising: bandwidth meter algorithm, average seek algorithm, and a deep learning algorithm.

18. The computerized method of claim 17, wherein the at least one prediction algorithm is selected based at least on said obtained player capabilities.

19. The computerized method of claim 17, wherein the at least one prediction algorithm is selected based at least on computation complexity constraints.

20. The computerized method of claim 17, wherein an attempt is defined to include reaching of the player to a previously calculated sync player position using selected at least one sync algorithm, and a result of each attempt is defined to include either success or failure to reach the sync player position, such that the player position is nearly synchronized with the reference position, and wherein said selecting the at least one sync algorithm further comprises:

obtaining a history of attempts and respective attempts results;

wherein the at least one prediction algorithm is selected based on at least the obtained history.

21. The computerized method of claim 1, the method further comprising:

determining that the player cannot reach any calculated sync player position;

transmitting to a reference server a failure notification.

22. The computerized method of claim 21, the method further comprising:

in response to transmitting the failure notification, receiving an updated reference position; and applying the synchronization process with respect to the updated reference position.

23. The computerized method of claim 1, the method further comprising:

determining that the user's device is out-of-sync by determining that the player position is not nearly synchronized with the reference position; and repeatedly:

obtaining a normalized reference position in the content; and based at least on the obtained normalized reference position, applying the synchronization process to reach a calculated updated sync player position, such that the player position, when reaching the updated sync player position, is nearly synchronized with the reference position.

24. The computerized method of claim 1, wherein the reference position is dynamically determined by a reference server.

25. A computerized method for facilitating a synchronized play of a content by a plurality of user devices joining a virtual shared watch room, wherein a reference position in the content is determined by a reference server and wherein each user device of the plurality of user devices performs the computerized method of claim 1.

26. A computerized system for facilitating a synchronized play of a content by a user device's player, the system comprising a processing and memory circuitry (PMC) configured to:
   receive a reference position in the content;
   retrieve a player position in the content; and
   based on the received reference position and the retrieved player position:
      determine if the player position is nearly synchronized with the reference position; and
      if the player position is not nearly synchronized with the reference, apply a synchronization process to reach a calculated sync player position, such that the player position, when reaching the calculated sync player position, is nearly synchronized with the reference position.

27. A non-transitory computer readable storage medium tangibly embodying a program of instructions that, when executed by a computer, cause the computer to perform a method for facilitating a synchronized play of a content by a user device's player, the method comprising:
   receiving a reference position in the content;
   retrieving a player position in the content; and
   based on the received reference position and the retrieved player position:
      determining if the player position is nearly synchronized with the reference position; and
      if the player position is not nearly synchronized with the reference position, applying a synchronization process to reach a calculated sync player position, such that the player position, when reaching the calculated sync player position, is nearly synchronized with the reference position.

* * * * *